(12) United States Patent
Block et al.

(10) Patent No.: US 10,379,497 B2
(45) Date of Patent: Aug. 13, 2019

(54) OBTAINING AND DISPLAYING TIME-RELATED DATA ON AN ELECTRONIC WATCH

(71) Applicant: Apple Inc., Cupertino, CA (US)

(72) Inventors: Eliza C. Block, San Francisco, CA (US); David A. Schimon, San Francisco, CA (US); Eric Lance Wilson, San Jose, CA (US); Joshua H. Shaffer, Woodside, CA (US); Paul W. Salzman, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 528 days.

(21) Appl. No.: 14/872,125

(22) Filed: Sep. 30, 2015

(65) Prior Publication Data

US 2016/0357151 A1 Dec. 8, 2016

Related U.S. Application Data

(60) Provisional application No. 62/171,952, filed on Jun. 5, 2015.

(51) Int. Cl.
*G06F 3/0482* (2013.01)
*G04B 19/24* (2006.01)
(Continued)

(52) U.S. Cl.
CPC ............. *G04B 19/24* (2013.01); *G04G 9/00* (2013.01); *G04G 21/02* (2013.01); *H04L 67/06* (2013.01)

(58) Field of Classification Search
None
See application file for complete search history.

(56) References Cited

U.S. PATENT DOCUMENTS 5,379,153 A * 1/1995 Ishii ..................... G04G 15/006
360/27
5,440,559 A * 8/1995 Gaskill .................. G08B 5/228
340/10.2
(Continued)

FOREIGN PATENT DOCUMENTS

CN 101911618 A 12/2010
CN 102577337 A 7/2012
(Continued)

OTHER PUBLICATIONS

PCT/US2016/034271, "International Search Report and Written Opinion", dated Aug. 22, 2016, 12 pages.
(Continued)

*Primary Examiner* — Phenuel S Salomon
(74) *Attorney, Agent, or Firm* — Kilpatrick, Townsend and Stockton LLP

(57) ABSTRACT

Systems, methods, and devices can allow a user of a watch device to conveniently view historical and/or future information. A user can use an input device to select times other than the current time, e.g., by activating a time travel mode. Information in a particular window of the watch device can change in accordance with selections of other times. The current information can be replaced by the historical and/or future information. The information can be displayed as a complication in a style window of a watch face of the watch device. Data records can be stored for time other than a current time (e.g., as historical and/or future information). After a mode of operation (e.g., time travel mode) is entered, a data record corresponding to a selected time can be retrieved and displayed in a window of the watch.

17 Claims, 11 Drawing Sheets

(51) Int. Cl.
*H04L 29/08* (2006.01)
*G04G 9/00* (2006.01)
*G04G 21/02* (2010.01)

(56) References Cited

U.S. PATENT DOCUMENTS

| | | | |
|---|---|---|---|
| 6,334,133 B1* | 12/2001 | Thompson | G06Q 10/063112 |
| 6,907,582 B2* | 6/2005 | Stanley | G06Q 10/109 |
| | | | 345/440 |
| 7,523,417 B2 | 4/2009 | Hintermeister et al. | |
| 7,954,064 B2 | 5/2011 | Forstall et al. | |
| 8,229,411 B2 | 7/2012 | Stallings et al. | |
| 8,930,824 B2 | 1/2015 | Bennett | |
| 9,916,075 B2 | 3/2018 | Chen et al. | |
| 10,175,866 B2 | 1/2019 | Block et al. | |
| 2002/0029160 A1* | 3/2002 | Thompson | G06Q 10/063112 |
| | | | 705/7.14 |
| 2003/0058287 A1* | 3/2003 | Stanley | G06Q 10/109 |
| | | | 715/864 |
| 2003/0103413 A1* | 6/2003 | Jacobi, Jr. | G04G 21/00 |
| | | | 368/10 |
| 2005/0013199 A1* | 1/2005 | Danks | G04G 9/0076 |
| | | | 368/19 |
| 2005/0081189 A1* | 4/2005 | Krasikov | G06F 8/73 |
| | | | 717/123 |
| 2005/0095067 A1 | 5/2005 | Hirose et al. | |
| 2005/0190652 A1* | 9/2005 | Marhic | G04G 9/0064 |
| | | | 368/15 |
| 2007/0067721 A1 | 3/2007 | Ur et al. | |
| 2007/0083827 A1 | 4/2007 | Mousseau et al. | |
| 2007/0101297 A1 | 5/2007 | Forstall et al. | |
| 2007/0255811 A1 | 11/2007 | Pettit et al. | |
| 2008/0062819 A1* | 3/2008 | Kelly | G01S 19/19 |
| | | | 368/11 |
| 2009/0049060 A1* | 2/2009 | Konik | G06F 16/217 |
| 2009/0237715 A1* | 9/2009 | Kasatani | H04L 63/0815 |
| | | | 358/1.15 |
| 2009/0327871 A1 | 12/2009 | Wolf et al. | |
| 2010/0145676 A1 | 6/2010 | Rogers | |
| 2010/0313154 A1 | 12/2010 | Choi et al. | |
| 2011/0012930 A1 | 1/2011 | Davis et al. | |
| 2011/0025719 A1 | 2/2011 | Yanase | |
| 2011/0099508 A1 | 4/2011 | Liu et al. | |
| 2011/0185029 A1* | 7/2011 | Jain | G06Q 10/109 |
| | | | 709/207 |
| 2011/0193878 A1* | 8/2011 | Seo | H04M 1/72544 |
| | | | 345/619 |
| 2011/0202883 A1 | 8/2011 | Oh et al. | |
| 2012/0208593 A1 | 8/2012 | Yang et al. | |
| 2012/0324390 A1 | 12/2012 | Tao et al. | |
| 2013/0086019 A1* | 4/2013 | Dantale | G06F 16/248 |
| | | | 707/705 |
| 2013/0254705 A1 | 9/2013 | Mooring et al. | |
| 2013/0335594 A1* | 12/2013 | Benko | G06F 16/58 |
| | | | 348/231.4 |
| 2014/0012511 A1 | 1/2014 | Mensinger | |
| 2014/0109003 A1 | 4/2014 | Saib et al. | |
| 2014/0109114 A1 | 4/2014 | Mahiddini | |
| 2014/0137036 A1 | 5/2014 | Han | |
| 2014/0143784 A1 | 5/2014 | Mistry et al. | |
| 2014/0250374 A1 | 9/2014 | Ohki et al. | |
| 2014/0279278 A1* | 9/2014 | Wijaya | G06Q 10/087 |
| | | | 705/26.81 |
| 2014/0325374 A1 | 10/2014 | Dabrowski et al. | |
| 2015/0058744 A1 | 2/2015 | Dhingra et al. | |
| 2015/0193418 A1 | 7/2015 | Koska et al. | |
| 2015/0199120 A1 | 7/2015 | Kim et al. | |
| 2016/0011868 A1 | 1/2016 | Frenkiel et al. | |
| 2016/0328174 A1* | 11/2016 | Uchimura | H04N 5/85 |
| 2016/0357282 A1 | 12/2016 | Block et al. | |

FOREIGN PATENT DOCUMENTS

| | | |
|---|---|---|
| CN | 102754354 A | 10/2012 |
| CN | 104460308 A | 3/2015 |
| CN | 104679402 A | 6/2015 |
| EP | 1898178 | 3/2008 |
| EP | 2360902 | 8/2011 |
| EP | 2487578 | 8/2012 |
| EP | 2733608 | 5/2014 |
| EP | 2921946 | 9/2015 |
| WO | 2016196171 | 12/2016 |
| WO | 2016196225 | 12/2016 |
| WO | 2016196434 | 12/2016 |

OTHER PUBLICATIONS

PCT/US2016/034458, "International Search Report and Written Opinion", dated Oct. 28, 2016, 17 pages.
PCT/US2016/034458, "Invitation to Pay Add'l Fees and Partial Search Report", dated Sep. 2, 2016, 6 pages.
PCT/US2016/034961, "International Search Report and Written Opinion", dated Sep. 9, 2016, 12 pages.
U.S. Appl. No. 14/872,117, "Non Final Office Action," dated May 9, 2018, 29 pages.
U.S. Appl. No. 14/872,117, "Final Office Action", dated Sep. 19, 2018, 29 pages.
U.S. Appl. No. 14/872,136, "Notice of Allowance", dated Sep. 19, 2018, 6 pages.
U.S. Appl. No. 14/872,136, "First Action Interview Pilot Program Pre-Interview Communication", dated Dec. 28, 2017, 5 pages.
First Action Interview Office Action Summary dated Feb. 26, 2018 in U.S. Appl. No. 14/872,136. 5 pages.
U.S. Appl. No. 14/872,117, "Non-Final Office Action", dated May 24, 2019, 29 pages.
CN201680031544.1, "Office Action", dated Jun. 18, 2019, 11 pages.

* cited by examiner

DEFAULT MODE

TIME-TRAVEL MODE

PAST

FUTURE

OBTAINING AND DISPLAYING TIME-RELATED DATA ON AN ELECTRONIC WATCH

CROSS-REFERENCES TO RELATED APPLICATIONS

The present application claims the benefit of and priority to U.S. Provisional Application. No. 62/171,952, filed Jun. 5, 2015; and is related to commonly owned U.S. Provisional Application No. 62/171,978, filed Jun. 5, 2015; U.S. Provisional Application No. 62/171,917, filed Jun. 5, 2015; and U.S. Provisional Application No. 62/129,835, filed Mar. 7, 2015, the entire contents of which are incorporated herein by reference for all purposes.

BACKGROUND

People often view historical and future information on a computer. Examples of historical information might be the scores of a football game at the end of each quarter. Examples of future information might be the weather forecast for the next few days or for the next few hours. Typically, such information would be provided in a list.

However, certain devices (e.g., a watch) can have a display screen of limited size, such that displaying a list of historical and/or future information is not practical. But, it still desirable for a user of such small devices to conveniently obtain such information.

BRIEF SUMMARY

Embodiments of the present invention can allow a user of a watch device to conveniently view historical and/or future information. A user can use an input device to select times other than the current time, e.g., by activating a time travel mode. Information in a particular window of the watch device can change in accordance with selections of other times. The current information can be replaced by the historical and/or future information. The information can be displayed as a complication in a style window of a watch face of the watch device. Data records can be stored for time other than a current time (e.g., as historical and/or future information). After a mode of operation (e.g., time travel mode) is entered, a data record corresponding to a selected time can be retrieved and displayed in a window of the watch.

Other embodiments are directed to systems, portable consumer devices, and computer readable media associated with methods described herein.

A better understanding of the nature and advantages of embodiments of the present invention may be gained with reference to the following detailed description and the accompanying drawings.

TERMS

Figure 1A:
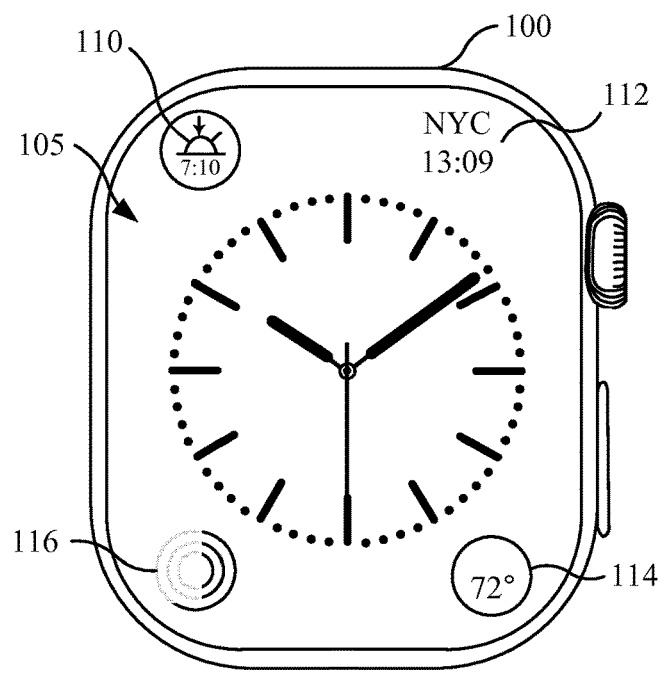
FIG. 1A shows a first example watch face of an electronic watch according to embodiments of the present invention.

A watch (or watch device or electronic watch) corresponds to any device that displays time. An example is a wristwatch or a pocket watch. A watch can have configurable watch faces.

A "watch face" corresponds to a particular layout for displaying a time and any complications. A device may have multiple watch faces defined for use. A "watch face" may be defined with time displayed in a particular manner, and include one or more "style windows."

A "complication" is an item on a watch face that does not tell time, such as date, weather, atmospheric pressure, calendar information, etc. A particular complication corresponds to a particular application running on the device displaying the watch face. A complication can be displayed within a particular "style window" of a watch face. A "style window" can correspond to a part of a watch face that is designated to display a complication. In some embodiments, a user can configure a watch face by determining which data (e.g., by selecting a watch application) is to be displayed in a particular style window.

"Templates" can be defined for "style windows." A style window can have one or more templates, with each template specifying data to be displayed in a different manner. Different data can also be displayed, or the same data, but displayed in a different manner.

A "companion" (or companion device) can correspond to any device that communicates with the watch. As examples a companion can correspond to a phone, a tablet, or a laptop computer. A companion can also be a server computer when the watch can communicate with a network. A "watch application" on the watch can have a corresponding "companion application" on the companion. For example, a new application on the companion can have a watch version on the watch, and the companion application can communicate with the watch application, e.g., via a "companion extension" that is part of the companion application.

A "complication controller" for a companion application can control a sending of updated complication data to the watch. The complication controller can be included in an extension of the companion application, where the extension enables communication on the watch.

A "travel time" refers to a past or future time that is selected by a user. The travel time would be different than a current time, and historical/future data corresponding to a selected travel time can be retrieved from memory of the watch to display to the user.

DETAILED DESCRIPTION

Embodiments of the present invention can allow a user of a watch device to conveniently view historical and/or future information. An input device can be used to select times other than the current time. Information in a particular window of the watch device can change in accordance with selections of other times. Thus, current information can be replaced by the historical and/or future information, thereby allowing a watch device having a small screen to display the historical and/or future information. The information can be displayed as a complication in a style window of a watch face of the watch device.

Such a time travel mode can allow a user to fast forward through complication data based on time. For each new selected time, the complication can display information for that time. For example, a user can turn a crown (an example of an input device) of the watch device to advance or rewind time relative to the current time. In some implementations, the user can use other input methods to advance or rewind time. For example, the user could touch the screen and drag his/her finger right or left to advance or rewind time, respectively. The current time and the adjusted time can both be displayed in different portions of the watch face. As time is adjusted, the complication data can be updated to reflect the data appropriate for that time. For instance, if the crown is turned to correspond to 4 hours in the future, the weather information in a first window can change from the current weather to the weather forecasted in 4 hours.

In some embodiments, N entries (data records) for various times can be received by the watch device. Each data record can include complication data for a particular time, with different data records corresponding to different times. The watch device can store the N data records (e.g., 100) in a cache for retrieval in response to a selected time in the past or the future. In some implementations, the adjusted time can be used to retrieve the data record that corresponds to a time that is closest to the adjusted time. If a user selects a time beyond any of the N data records, then new data can be requested. In some embodiments, a companion application executing on a companion (e.g., a phone) can provide the N data records to the watch device. In other embodiments, different numbers of data records can be received for different complications.

A watch face can have a plurality of complications. In such situations, historical and/or future information can be received for each of the complications, e.g., a set of data records can be received for each of the complications of the watch face. The times for the different sets of data records can vary. For example, one set of data records can span two hours and another set of N data records can span 24 hours. Thus, one set can have data that is more dense (i.e., less time between data records) than another set. Accordingly, the information displayed in different complications can change differently as time is selected with the input device.

I. Complications

Complications can allow a user to efficiently see other data besides time when looking at a watch face. On mechanical watches, the complications operate by moving gears in the mechanical watch that provide periodic information. In some embodiments, the electronic watch can be configured with a multitude of different complications, where data can be obtained from other devices. New applications that are installed on the watch can be used to add new complications to certain style windows of various watch faces.

A. Example Watch Faces with Complications

FIG. 1A shows a first example watch face 105 of an electronic watch 100 according to embodiments of the present invention. Example watch face 105 shows a mechanical-style watch face with a minute hand and an hour hand. Example watch face 105 includes four complications 110, 112, 114, and 116.

Complication 110 shows a time for sunrise for the current day, or potentially for a following day. As shown, sunrise is to be at 7:10. An icon showing half the sun being visible indicates that the time is for sunrise. Complication 110 thus includes time data that changes and includes an image, which is typically static. Complication 110 could also be configured to show a sunset, or both a sunrise and a sunset. A direction of an arrow can designate sunrise or sunset. At some time after sunrise, complication 110 could change to show a time for sunset, and similarly after sunset, showing a time for sunrise for the next day.

Complication 112 shows a time for a particular location, New York City in this example. Here, the information for complication 112 can be derived from the current time of the current location of the watch. Other complications can require obtaining data from another device, e.g., a companion device.

Various complications may be used for different windows of a watch face. For example, for the window in the upper right corner, the complication could be a moon phase for how much of the moon will be visible that night. The moon phase can change periodically, e.g., once a day at a prescribed time. New data can be received at the prescribed time, and complication 112 can be updated. Complication 110 can also be updated at a prescribed time once new data has been received.

Complication 114 shows a current weather temperature, e.g., an outside temperature near electronic watch 100. By current, this is the most recent weather temperature that was received. A temperature can be received from a weather application running on the watch or a companion device, which can obtain the temperature from a server that is in communication with a weather service. Such a weather service can be a private or public service that can have weather sensors near a location of electronic watch 100.

How often a new temperature is received can depend on various factors, such as a current battery level of electronic watch 100, power consumption to obtain the new weather temperature, and user preference as to how often the user would like to update the weather temperature. In various embodiments, the update of any complication can depend on one or more of these and other factors.

Complication 116 can show activity information for electronic watch 100. As shown, there are three concentric rings, each having a different amount highlighted. Each ring can correspond to a different type of activity. Examples of types of activity include moving (e.g., walking), exercising (e.g., quicker motion than moving, such as running), and standing. The amount highlighted in a ring can correspond to an amount of that activity for a day completed relative to a goal amount. A completed ring can correspond to the goal amount being achieved.

Figure 1B:
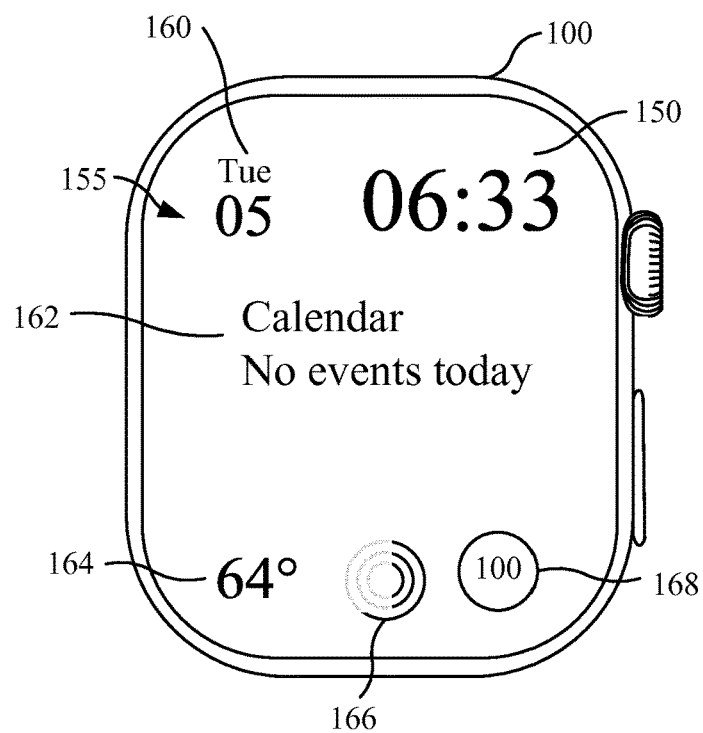
FIG. 1B shows a second example watch face of an electronic watch according to embodiments of the present invention.

FIG. 1B shows a second example watch face 155 of an electronic watch 100 according to embodiments of the present invention. Second example watch face 155 corresponds to a modular watch face that shows digital time. Window 150 shows digital time with four digits. Various types of digital time can be shown, e.g., on a 24-hour basis or on a 12-hour basis with AM and PM designated. Example watch face 155 includes five complications 160, 162, 164, 166, and 168.

Complication 160 shows a day of the week and the date of the month. Thus, complication 160 shows two pieces of information. Such information can be generated by an application on electronic watch 100, e.g., by a calendar application, and provided to second example watch face 155. In some embodiments, the exact format for displaying the day and date can be configured by a user for a particular watch face or changed by selecting a different watch face.

Complication 162 shows calendar event information. Complication 162 can show various information, such as a day of the week, date, and/or time, along with information about any calendar events associated with the day and/or time. As another example, complication 162 can show the word "calendar" to indicate the type of data. Calendar event data can be shown for the associated day and/or time of day. For example, complication 162 can show a title of an event starting at a time, which is also displayed. Another example includes displaying a number of events after a certain time.

As shown, complication 164 shows a current weather temperature. Complication 166 shows concentric rings for an amount of completion of activity. Complication 168 shows a battery level. Other example complications include an alarm time, a timer (different symbol from the alarm), a stopwatch, a world clock to get time in another time zone (e.g., for a specific city), and stock quotes.

Further examples can include any application, e.g., by a third party, that can provide complication data in a template format. Such third party complications can be formed from various applications, such as for news, social media, sports, and weather.

In some implementations, certain complications can receive updated data (e.g., in a template format) and a display routine for a watch face can determine how to display the updated data. In some embodiments, once a time travel mode has been enabled, a complication can change in response to user input for selecting a historical and/or future time. Such new data can be received by the complication from an application running on the watch or from an application running on another device, which may be communicated with the watch application.

B. Watch Face with Style Windows

On mechanical watches, the set of complications on the watch are fixed. If one wanted different complications, then a new watch would need to be purchased. Whereas on an electronic watch, a user can select a particular watch face from a list of available watch faces. Different watch faces can have different layouts of complications, different numbers of complications, and different sizes of windows for displaying the complications. The windows of a watch face can be referred to style windows, where a particular watch face can correspond to a particular style.

Figure 2:
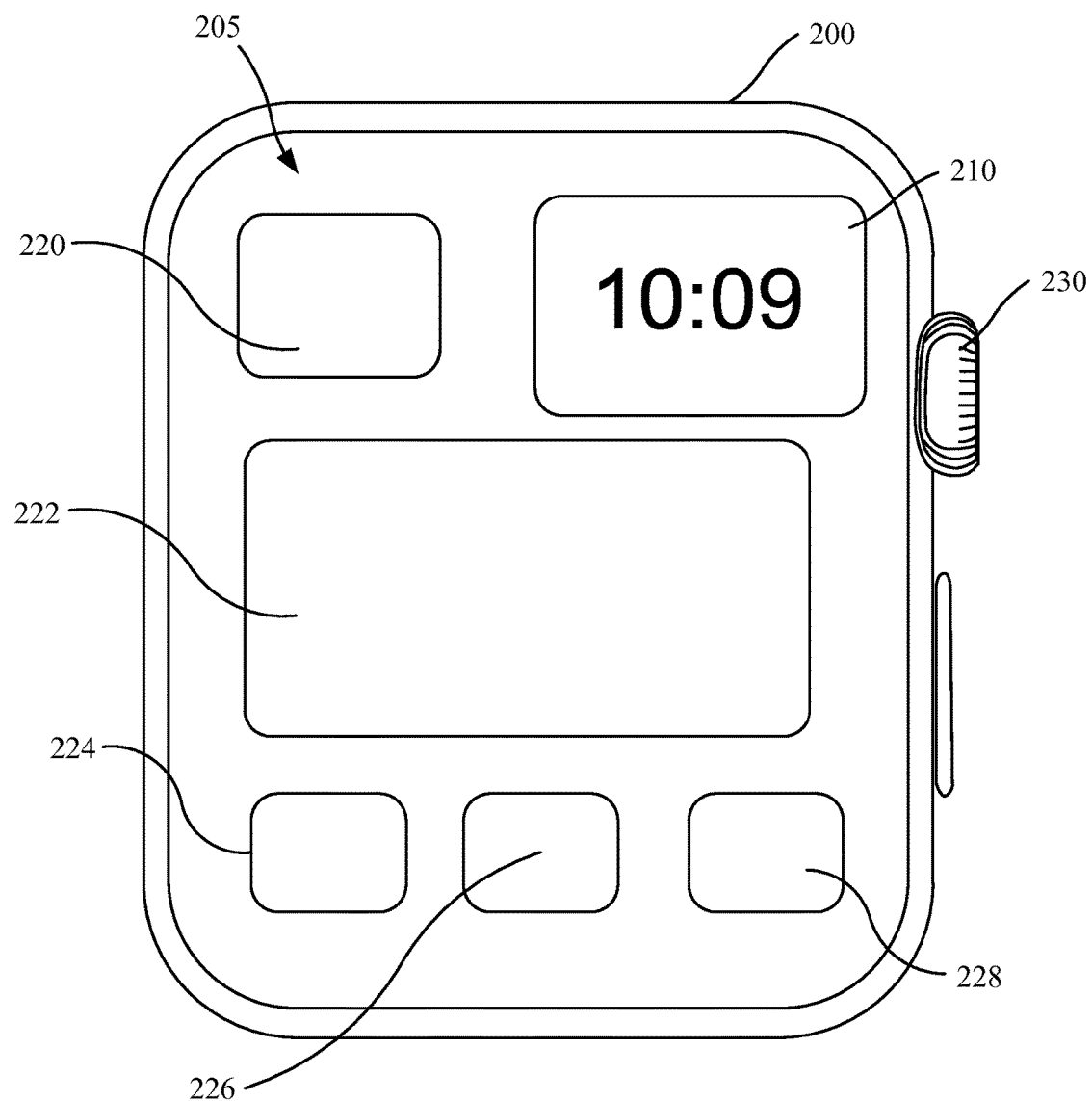
FIG. 2 shows a modular watch face of an electronic watch according to embodiments of the present invention.

FIG. 2 shows a modular watch face 205 of an electronic watch 200 according to embodiments of the present invention. Modular watch face 205 includes a time window 210 and five style windows 220-228 for complications. Modular watch face 205 is shown with a particular layout of complications. Different style windows can be of different sizes and show different amounts of data. For example, style window 222 can show more data as it is larger than style windows 224-228. Thus, a user might want to configure style window 222 to show a complication corresponding to an application that needs to show more than one piece of data, e.g., show more than one number.

One or more display windows (which may correspond to a style window) of a watch face can overlap with each other such that a graphic from one display window can be overlaid on top of a graphic from another display window. For example, time window 210 can show time over a graphic (e.g., a position of the Earth or the sun) that corresponds to the current time.

In some embodiments, a user can enter a customize mode where a complication can be selected for displaying in a particular style window. Electronic watch 200 can include a digital crown 230 for selecting a complication to appear in a selected window. Different style windows can have different templates for displaying (formatting) information. A same style window can be used for more than one watch face. Different style windows can have different shapes and different aspect ratios. A same style window could have different sizes.

Example style windows for complications include: small (e.g., for analog watch faces, such as 112), small modular, large modular, small utility (e.g., rectangular for analog watch faces), large utility, and circular. A style window can be considered a container for displaying a complication. Thus, a same application can display different information in different types of style windows, resulting in different complications for different style windows of a same watch face. Further examples of watch faces are below.

C. Other Example Watch Faces

An astronomy watch face can display one or more graphic complications for the solar system (e.g., position of moon, sun, Earth, or other planets), day, date, and current time. In some implementations, there are no complications to customize, while complications can be customized in other implementations. In some embodiments, one or more of the graphic complications can change in response to user input, e.g., moving digital crown 230. For example, a user can move the planets forward and backward in time by turning the digital crown 230.

A solar watch face can display the sun's current position in the sky on a curved line based on a current location and the time of day. In some embodiments (e.g., using a digital crown), a user can move the sun across the curve to see it at dusk, dawn, zenith (solar noon), sunset, and darkness (solar midnight). The face's colors can change over the course of the day to match the time.

In some embodiments, time can be displayed using such physical features, with no digital time or analog time being displayed. For example, a position of the sun can indicate a time, and thus correspond to time information. Other complications can then be added to such a watch face.

A chronograph watch face can be modeled on analog watches with two hands: one for total time and a second for lap times. A customizable timescale can measure long and short time periods. Different watch faces can have different complications available. For example, a chronograph watch face might have a particular set of complications available, such as: date, calendar, moon phase, sunrise and sunset, weather, stocks, activity summary, alarm, timer, battery life, and world clock. A particular set of third party complications can also be used.

A color watch face can provide the time in a range of bright colors that can be changed to suit a user's mood, e.g., using a digital crown to choose a color. In some embodiments, watch faces with options for complications can allow a user to not select a complication for a style window, thereby leaving the window blank. Some watch faces can add pictures or a character in a representation of an analog watch face. Further, a graphic complication can provide motion video, e.g., of an object in nature.

A watch can allow configuration of any watch face, and a user can save a particular configuration for a customized watch face. Such configuration can include settings such as color and layout of the particular watch face. The customization can also include particular complications chosen for a configuration. In one example of customizing a watch face, a display screen of the watch can be firmly pressed, and then a user can swipe to a particular direction to access an add input (e.g., a + icon). A user can swipe up and down to browse the faces and tap the one the user wishes to add. The user can then customize the face to the user's preferences. A watch face can be deleted by firmly pressing the display, swiping to the face not wanted, then swiping up and tapping delete.

II. Communication with Companion

An electronic watch can communicate with a companion device to obtain updated information, e.g., for a complication. For example, a sports application can execute on a companion device, retrieve sports data from a server, and provide the sports data to the watch for displaying in a complication. Various mechanisms can exist on the companion device and the watch to control how and when such complication data is provided.

To obtain new complication data, a companion application may need to be woken up (launched). Embodiments can determine triggers for launching a companion application, e.g., based on previous uses of the companion application or a corresponding watch application. Once a particular companion application is launched, the companion can instruct the particular companion application to obtain new data, e.g., from a server. New complication data can also be pushed by a server. Modules on the companion can determine when to send the complication data, e.g., based on any one or more of usage of both devices, power states of both devices, and user preferences. A watch application and/or system routines on the watch can process the new complication data, e.g., determining how to display. And, then the new complication data can be displayed.

A. System Diagram

Figure 3:
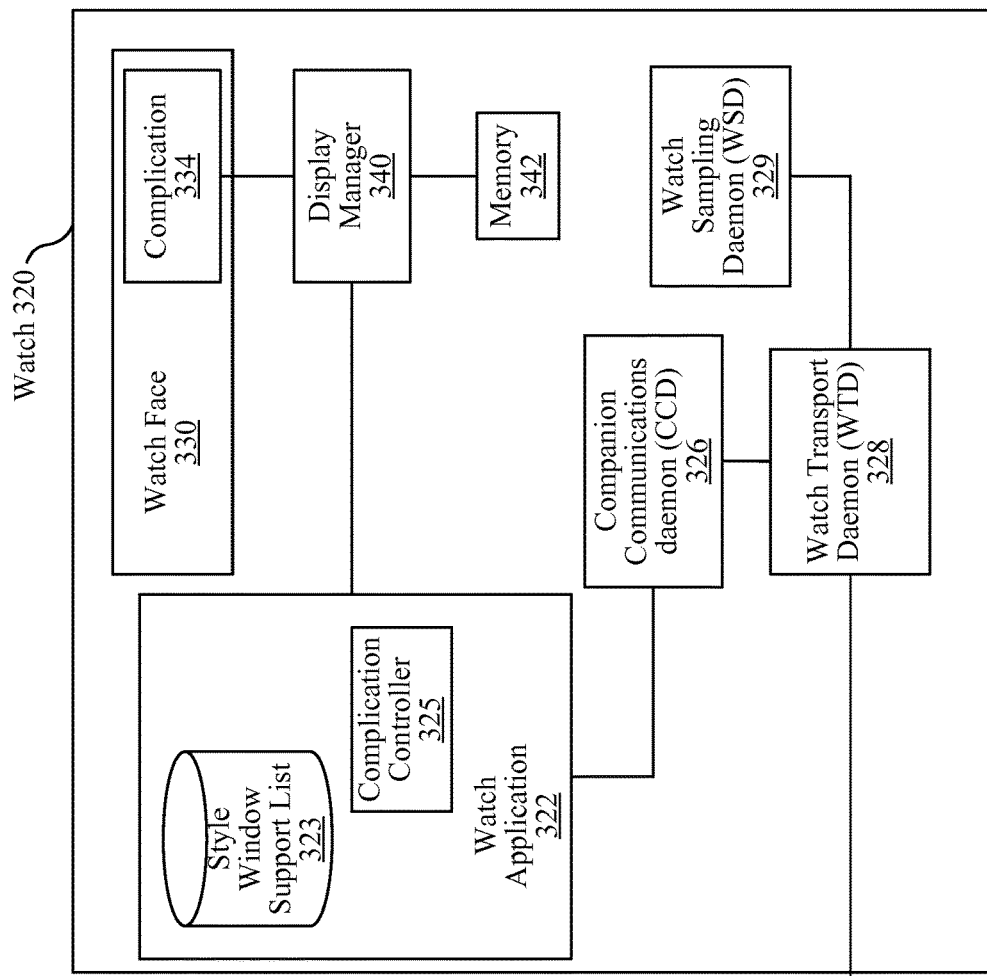
FIG. 3 shows a companion in communication with a watch according to embodiments of the present invention.
Figure 3:
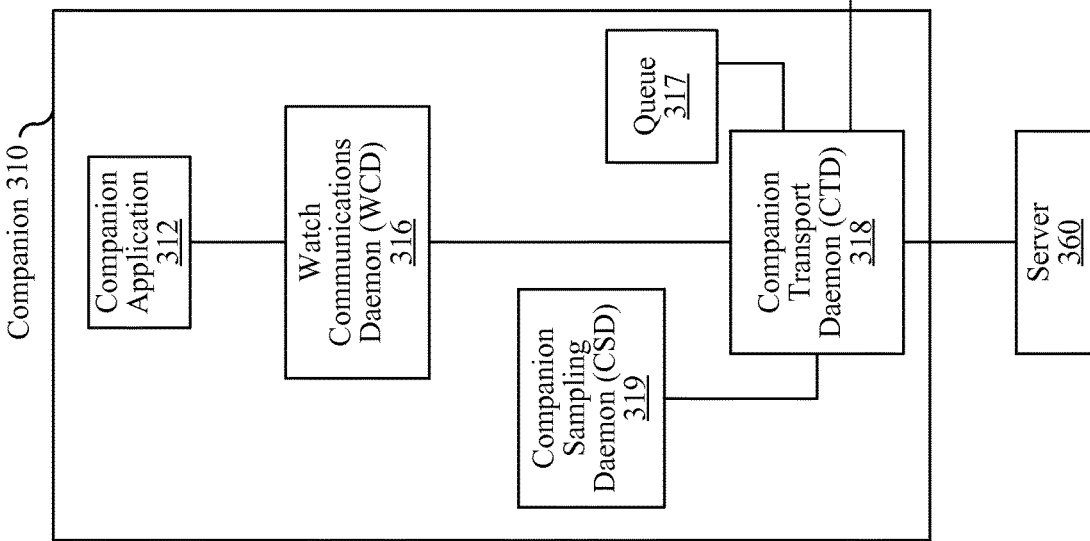

FIG. 3 shows a companion 310 in communication with a watch 320 according to embodiments of the present invention. Lines in FIG. 3 correspond to communications that occur in either direction.

An application package for a particular software application can include software components for companion 310 and for watch 320, e.g., a companion application 312 and a watch application 322, respectively. For example, a news application from a particular publisher (e.g., for a particular newspaper, TV show, or website) can have one component that runs on companion 310 and a corresponding component that runs on watch 320. In addition, the software application can include an application extension (not shown). The application extension can be used for communications between the watch application 322 and the companion application 312. The application extension can execute on the watch or the companion. These software components can execute independently or together, e.g., as part of providing updated complication data to watch 320. In other embodiments, the software components can be downloaded separately to the two devices. Companion application 312 and watch application 322 are examples of client applications.

Companion application 312 can function as a standalone application that operates on companion 310 without any need to interact with watch 320. Companion application 312 may include an extension that is used to communicate with watch 320. Such an extension could be downloaded and installed separately from companion application, e.g., to provide add-on functionality.

A watch communications daemon (WCD) 316 can determine how communications are to occur with watch 320. WCD 316 can determine a particular manner for sending any data (e.g., complication data) from companion application 312 to watch 320. For example, WCD 316 can determine which watch applications are currently running, and only send data to a particular watch application when that watch application is running. If the particular watch application is not running, then the data can be queued. As other examples, WCD 316 can perform background process for sending data (e.g., files) according to specified rules, e.g., send data for a specified amount of time, and when not finished then pause (e.g., so that other data can be sent).

WCD 316 can also process any data such that the data is in a format that can be determined by watch 320. For example, companion application 312 may send the data in a same format regardless of the destination device, and WCD 316 can translate the data into a format suitable for a watch. For example, only higher level communication options may be exposed to the companion applications, and all of the lower-level options available to a companion transport daemon (CTD) 318 may not be exposed to the companion application. WCD 316 can perform the translation between the higher-level concepts in low-level features of CTD 318. Other daemons can do processing for other types of devices.

WCD 316 can also translate data received from watch 320 into a format that is readable by companion application 312, or any companion application. WCD 316 can also interpret one or more request commands from watch 320, where the request commands request data (e.g., complication data) from companion application 312, or other companion applications. WCD 316 can then send a request for the data in a suitable format to the companion application. WCD 316 can interact with an application manager (not shown) that can launch a companion application, if needed.

CTD 318 can transmit data to and receive data from watch 320. WCD 316 can provide logic for determining specifically how to communicate with watch 320, while CTD 318 can communicate with various other devices besides a watch. CTD 318 may be an identity services daemon, e.g., as described in U.S. patent application Ser. No. 14/475,060 entitled "Proxied Push" filed Sep. 2, 2014, the disclosure of which is incorporated by reference in its entirety. WCD 316 and CTD 318 can be part of an operating system of companion 310.

If WCD 316 determines that data should not be sent, WCD 316 may decide not to provide the data to CTD 318. WCD 316 can do this in a variety of ways. For example, WCD 316 may not inform companion application 312 the data should be sent. As another example, WCD 316 can inform companion application 312 that the data cannot be sent, and thus companion application 312 can wait until later to try and send the data. In yet another example, WCD 316 can queue the data. WCD 316 can further track which data has not been sent, and potentially remind companion application 312 at a later time.

A companion sampling daemon (CSD) 319 can track interactions of the user with the device as events, and determine predictive interactions and respond proactively. CSD 319 can be in communication with other modules on companion 310, e.g., an application manager. For example, CSD 319 can determine when a particular companion application should retrieve data for sending to watch 320, e.g., when to obtain new complication data as part of an update. As another example, CSD 319 can track user interactions with watch 320 (e.g., by receiving tracking information from watch 320) and determine when to retrieve and send data to watch 320. CSD 319 can perform such determinations by creating models and determining prediction probabilities for how a user might interact with companion 310. Further details for sampling demons and a transport daemon (e.g., a push daemon) can be found in U.S. Patent Publication 2014/0366041.

In some embodiments, CTD 318 can queue data in queue 317 to preserve battery life of watch 320, and send the queued data when other data is requested by watch 320 or when other data is sent to watch 320 (e.g., when certain high-priority data is sent or a sufficient amount of data is to be sent). For example, certain data (or certain companion applications) can be flagged to allow sending of data at times when other data would not be sent, e.g., regardless of a current state of watch 320. When CTD 318 cues the data, WCD 316 can store a record of what the content is, so that when a response is received in response to a particular message, the response can be associated with a particular message that was sent.

A watch transport daemon (WTD) 328 on watch 320 can communicate data sent to/from CTD 318. A companion communications daemon (CCD) 326 can provide protocols for specifically communicating with companion 310. CCD 326 can provide translation of communications to and from watch applications, such as watch application 322. A watch sampling demon (WSD) 329 can track previous user interactions with watch 320 in a similar manner that CSD 319 can track user interactions with companion 310. WSD 329 can also make predictions for how a user might interact with watch 320. In response to such predictions, WSD 329 can cause data to be requested from companion 310.

Watch application 322 can include a style window support list 323 that identifies the style windows that watch application 322 supports. Certain watch applications may only support certain style windows. In some embodiments, if a watch application supports a style window, the support applies for all watch faces that use that particular style window. In one embodiment, watch application 322 can run code from a developer in an extension, and the system can provide code that ensures data from the developer's code is interpreted properly by system modules, such as display manager 340.

A complication controller 325 can determine how and when complication data is sent to a display manager 340, which can manage displaying of data on a screen of watch 320. Complication 334 can be generated as an object on a watch face 330, and complication 334 can be specifically associated with watch application 322. The complication data can be sent from companion application 312 through various components over to watch application 322. In some embodiments, complication controller 325 can determine a specific template corresponding to a style window being used to display complication 334.

Complication controller 325 can create a complication data object according to the selected template, and send the complication data object to display manager 340. Display manager 340 can identify the template that is used to identify the new complication data. Based on the specific template used, display manager 340 can determine how to display the new complication data, e.g., using other settings for watch face 330, such as color or presentation style.

In some embodiments, when watch application 322 is launched in the foreground, a command can be sent to companion 310 to launch companion application 312 so that any data can be transferred between the two applications. In one example, watch application 322 can launch and receive user input to transfer one or more files from companion 310 using companion application 312. When watch application 322 is only running in the background, watch application 322 can be disabled from launching companion application 312.

Companion 310 and/or watch 320 can track which applications currently provide complication data to watch face 330. Such information can be used to determine which applications can transfer data between companion 310 and watch 320. Further, watch 320 can determine which watch applications can support a particular style window, e.g., by looking at the support lists in each of the watch applications. Such information can be used when configuring a watch face.

Complication controller 325 can provide a preferred data refresh rate for how often the data in a complication is to be refreshed. This data refresh rate can be used to determine how often to request data from companion 310, or how often companion 310 is to send data to watch 320. In various embodiments, CSD 319 and WSD 329 can use the data refresh rate along with other factors (e.g., power state and other predicted user interactions) to determine how often to update complication 334 on watch face 330. Thus, the preferred refresh rate can be overridden based on system considerations (power, etc.). The preferred refresh rate can be defined in various ways, e.g., a time for a next update, an amount of updates per time period, an amount of data per time period, and like, as well as a combination thereof. In some embodiments, complication controller 325 can make an interactive request to obtain new complication data.

Display manager 340 can show the icons of watch apps and host the watch faces. Display manager 340 can act as a carousel application to provide information when needed. In some embodiments, display manager 340 can access complication data in a memory 342, which may store historical and/or future complication data. Memory 342 can be various types of memory and include different memory modules of different types for different purposes. For example, memory 342 can include a cache that acts as operating memory for currently running processes and include a persistent memory (e.g., flash memory) that can store data after a device is turned off.

Display manager 340 can know the companion applications that can provide complication data to watch face 330, and decide, based on resources, when to wake up a particular companion application. In other implementations, such a determination can be made by WSD 329, which may be in communication with display manager 340, or made by both. Display manager 340 can determine how long to cache the data in memory 342 to keep watch face 330 responsive, but also not bogged down with excessive caching.

Companion application 312 can get updated complication data from server 360. Different companion applications can correspond with different servers. Thus, a server might provide updated data for a particular complication. A server might be associated with a particular topic (also called a feed).

In one example, assume there are two watch faces with five different complications on each watch face, and a user switches to a different watch face. A list of active complications can be updated on companion 310 and/or watch 320. Companion 310 can inform any servers associated with an active complication (e.g., based on active topics), and inform any servers that were associated with an active complication but are no longer. The servers can now change a deliberate priority for pushes to companion 310 based on the active state of a complication on watch 320. For example, a server for a complication on an active list would have pushes to companion 310 be low priority. Such low priority data can be sent to watch 320 only when it is awake or when other data is sent, as can data sent from server 360 to companion 310, while messages that are for the currently active complications can get a special treatment where they can wake up watch 320. In some implementations, high priority messages from server 360 can wake up companion 310, whereas lower priority ones can wait until companion 310 wakes up.

In some embodiments, messages with a regular or low priority on companion 310 can be sent to watch 320 when the watch requests data, or other data is being sent. For example, a user may have requested the file to be transferred, and other messages can be sent at that time since watch 320 is known to be awake. Messages can increase in priority the longer they wait in the queue, and finally be transferred immediately when a connection is made to watch 320, if the amount of time has become sufficiently long.

In other embodiments than shown in FIG. 3, companion application 312 can have an app extension that is designated for communicating with a watch. The application package can include a companion application, an app extension, and a watch application, which may include an interface file specifying how data of the watch application is displayed. In some embodiments, companion 310 can help to install a watch application on watch 320 by downloading the application package and providing the watch application to watch 320.

B. Getting Updates on Companion

New data destined for watch 320 can be received at companion 310 in a variety of ways. The corresponding companion application can be launched to obtain the data. The companion application can be launched in response to a push from a server, e.g., with the latest score of a sports game. As another example, a companion application can be launched in response to a signal from CSD 319, which may be determined that the user is likely to use the companion application and thus the companion application can be launched in the background. Once the companion application is launched, data can be obtained by a push or pull from the server. This data can then be sent over to watch 320 according to protocols described above.

In one embodiment, a preferred refresh rate can be sent from watch 320 to companion 310, and a corresponding companion application can periodically fetch the new data from a server. For example, current weather information can be retrieved every hour. In some implementations, CSD 319 may still determine whether or not the preferred refresh rate is going to be honored. A priority of a particular companion application might be used to determine whether to honor the preferred refresh rate. The preferred refresh rate can be based on a developer's settings and/or user input. Thus, CSD 319 may give more weight to the preferred refresh rate for companion applications with higher priority.

1. Background Process on Companion

In some embodiments, a companion application can choose to opt into being launched in the background to obtain new complication data to send to a watch. The companion application can be periodically launched based on an analysis, e.g., by CSD 319. A companion application can be allotted a certain budget for an amount of data and/or power that can be used in updating data on the watch (e.g., complication data).

As an example background process, CSD 319 can track that a user launches a particular companion application or watch application at a particular time every day, e.g., 9:00 AM. CSD 319 can cause the particular companion application to launch and obtain the new data, and push the new data to the watch. Thus, whether user launches the watch application or views a watch face with a complication corresponding to the watch application, the data is readily available.

2. Pushes from Server

A server can send pushes for things like showing a notification or telling a user that there is new content to fetch. In some embodiments, a server can inform the companion application that there is an update for complication. The message to inform the companion application can include the updated data for the complication. For example, an update to a sports game can be pushed from the server to companion 310, and then push to watch 320.

When a push comes into the companion and is received by WCD 316, the corresponding companion application can be launched. The companion application can process the data, and then send a request to WCD 316 to send any data to watch 320, e.g., send new complication data. Then, depending on any associated scheduling determined by CSD 319, a push message can be sent to watch 320. Watch 320 can receive the push message, and wake up the corresponding watch application. The corresponding complication controller can then provide an updated complication data object to display manager 340 for updating the corresponding complication. The operations on the watch can be the same regardless of how companion 310 obtains the data.

C. Getting Updates to Watch

The companion and watch can exchange information to determine how often to update the complications. In various embodiments, logic in either device can determine an appropriate time for updating the complication data.

In some embodiments, a companion application can send preferences for when and how often the companion application would like to update the complication data, e.g., by specifying a refresh rate. The watch (e.g., by WSD 329 and/or display manager 340) can then determine when to request an update to a complication. The watch can ask the companion for the updated complication data at different points in time, e.g., based on battery level, power consumption, user preferences, and the like. Further, certain actions on the watch can prompt a request from the companion, e.g., when the watch application is launched in the foreground.

In other embodiments, the companion application can determine whether to send the complication data to the watch, e.g., based on preferences received from the watch. The companion application 312 corresponds to an active complication, such a companion application can be allowed more budget for sending messages to the watch.

The refresh rate can vary for different companion applications. For example, some complications can refresh every few minutes for certain periods of time, and other complications may only update a few times a day or less. For example, an application that identifies a birthday would likely refresh no more than once a day. Thus, a companion application may have long periods of downtime with no refreshes. Whereas, a social media application could refresh many times during the day, and a user may want to see many of those refreshes.

Both devices can balance an amount of expected refreshes according to an expected number of refreshes for the complications on an active watch face. In some embodiments, the companion application can have a brief window that may be allowed to update frequently. But, for power reasons, the complications may not be updated frequently for long periods of time.

Figure 4A:
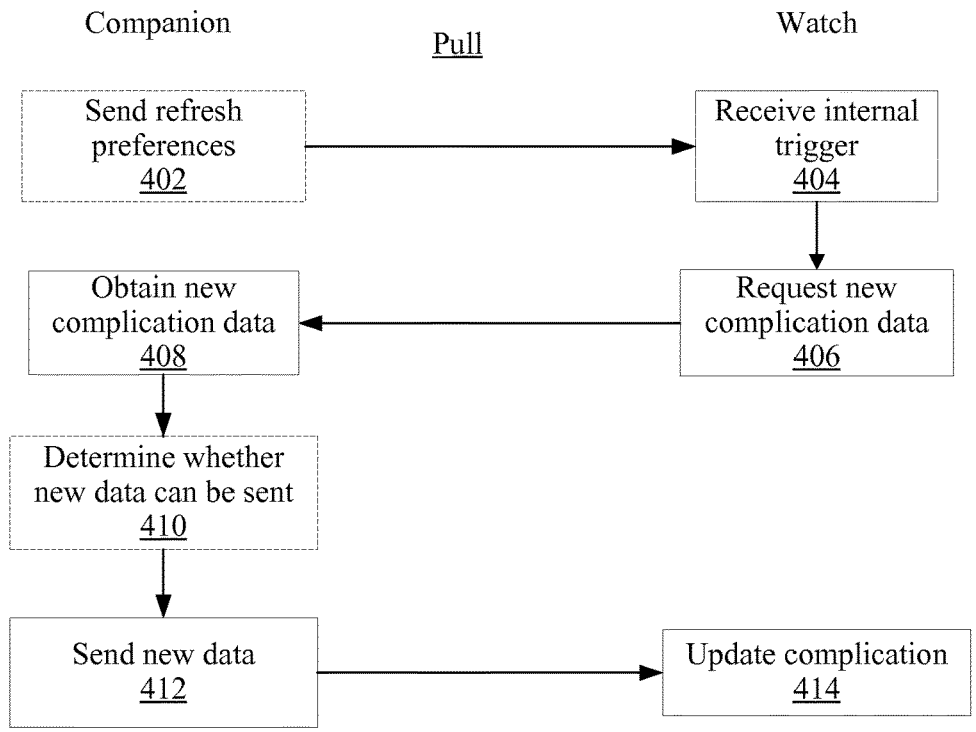
FIG. 4A shows a flowchart of a method where the watch requests an update to complication data from a particular companion application according to embodiments of the present invention.
Figure 4B:
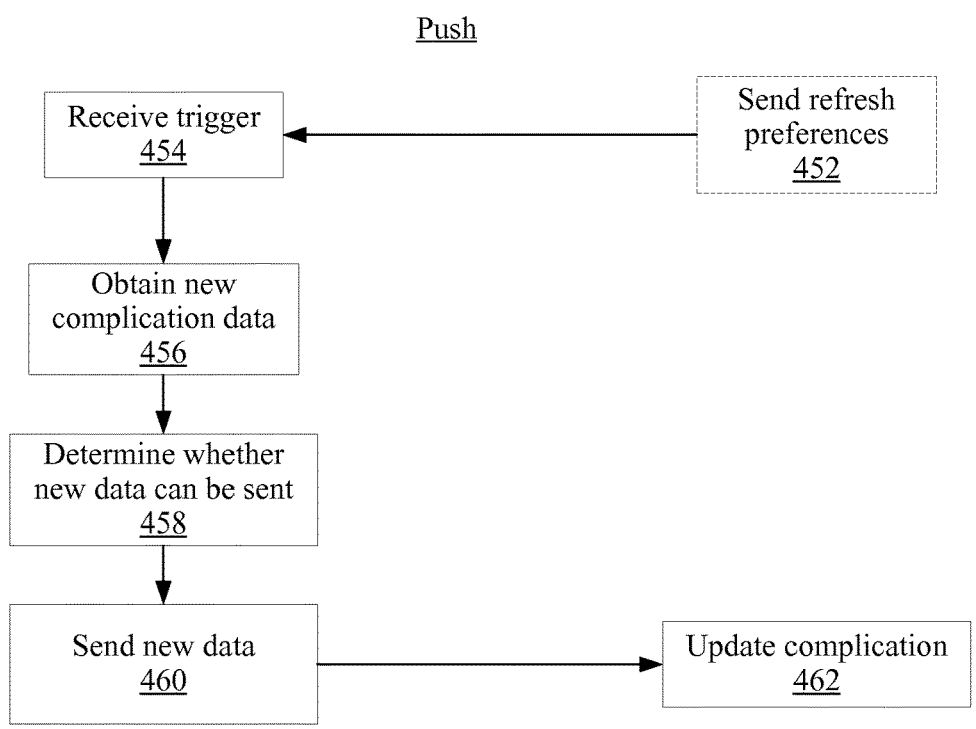
FIG. 4B shows a flowchart of a method where a particular companion application provides an update to complication data to the watch according to embodiments of the present invention.

FIGS. 4A and 4B show flowcharts illustrating steps performed by the companion and the watch for updating applications on the watch with new data.

1. Pull

FIG. 4A shows a flowchart of a method 400 where the watch (e.g., by WSD 329 and/or display manager 340) requests an update to complication data from a particular companion application (app) according to embodiments of the present invention. Various blocks of method 400 can be optional. Method 400 relates to updating a particular complication that corresponds to a particular companion application.

At block 402, the companion application can send refresh preferences. Examples of refresh preferences can include a refresh rate, a starting time for updating complication data (e.g., for a given day or date), and an ending time for updating complication data. The companion application can know that the refresh preferences are simply preferences, and that the actual refresh rate from the watch may differ.

In some embodiments, a complication controller in the companion application can provide the refresh preferences. The complication controller can determine the refresh preferences based on information obtained from the companion app, e.g., expected rates of change of the data and the nature of the data (e.g., certain times the data may be expected to change, as may occur for sporting events).

At block 404, an internal trigger is received. The internal trigger can be generated within the watch, e.g., when it determines a suitable time to update the complication data with a particular companion application. Such a determination can be based on the particular application refresh preferences and a current state of the watch (e.g., battery life, whether in active use by a user, or how much power such the refresh will use), and may be determined by WSD 329. In some implementations, a user can explicitly request an update to a complication, e.g., by selecting via touch or otherwise activating the complication, such as by voice.

At block 406, the watch can request new complication data, e.g., via WTD 328. CTD 318 can identify that the message corresponds to WCD 316, e.g., because the communication came from the watch. WCD 316 can identify the corresponding companion application. Along with the request for the complication data, the watch can ask for any new refresh preferences. Thus, in some embodiments, the companion application can provide new refresh preferences.

At block 408, the companion application can obtain new complication data in response to the request. For example, companion application 312 can retrieve the complication data from a server. In some implementations, the companion application can request the new complication data from a server, or such new complication data can be pushed to the companion, e.g., periodically. In other implementations, the new complication data can already have been stored by the companion. For example, the companion application can periodically request such data from a server, such as obtaining top news stories on a periodic basis. The companion can make a request to the server to determine any new items, and only obtain items now restored by the companion.

The companion can also determine whether to obtain the new complication data. For example, the companion can decide based on a state of the companion, e.g., battery level per connection state to a network. Thus, a management process of the companion (e.g., CSD 319) can determine whether the companion application gets to run or stops running.

When the new complication data is obtained, the companion application (e.g., by a complication controller) can create an update object that includes the new complication data. The update object can specify a particular template for displaying the new data. In other embodiments, the watch application can specify the particular template.

At block 410, the companion can determine whether to send the new complication data. Such a determination can be made by a WCD 316, which can track the complications that are in current use by the watch, and potentially be affected by other state information about the watch (e.g., a connectivity state and resources), as may be determined by CSD 319. Such a determination can be selectively made, e.g., the new complication data may have taken more than a threshold amount of time to obtain, and thus operations of the watch may have changed. Such a determination can also be made with respect to other communications involving the watch, e.g., a file may be in the process of being transferred.

At block 412, the new complication data is sent to the watch, e.g., when it has been determined that the new complication data can be sent. New refresh preferences can also be sent in a same time, e.g., in a same message. The new preferences can specify a preferred time for when the watch is to request the next update for the particular complication application.

At block 414, the watch can update the corresponding complication. In some embodiments, the new complication data can be sent in a specific format (e.g., from a complication controller in the watch) that identifies a particular template for displaying the data in a corresponding style window. A display manager can interpret the data corresponding to the particular template in an update of the complication. The particular template may be one of the plurality of predetermined templates for the style window selected for showing the complication. The display manager can use a particular template along with other settings of the watch face (e.g., color).

In this manner, the watch can control how often the complication data is updated. Otherwise, a companion application corresponding to a complication on an active watch face can cause unwanted processing on the watch. Such control of the complication data can reduce instances where the watch gets unnecessarily slowed down by new data from companion applications.

As an example, a complication can correspond to a sports application, which may provide scores for a particular game. In such an example, an app extension of the sports application can send user preferences to the watch, indicating a particular start time for when updated scores may be desired for showing in the complication. The watch may then not send any requests for new data until the start time, and thus the watch can save power.

The user preferences of the sports application can also indicate a preferred refresh rate once the game starts. An application may have a certain allotment of refreshes to a complication during a day, then thus the sports application can determine a particular refresh rate based on an expected length of time for the game for its given allotment of refreshes. The watch can then send requests based on the preferred refresh rate, and the sports application can retrieve the scores at that time or provide the scores if the scores had previously been retrieved.

2. Push

FIG. 4B shows a flowchart of a method 450 where a particular companion application provides an update to complication data to the watch according to embodiments of the present invention. Various blocks of method 450 can be optional. Method 450 can be performed in logic of the companion to manage transmission of new data to the watch, e.g., so as not to overburden the watch and drain the battery.

At block 452, the watch can send refresh preferences to the corresponding companion application. The refresh preferences can be sent at various times, e.g., once a day or multiple times during the day. The refresh preferences can include current state information of the watch, which may be used by the companion to determine an appropriate refresh rate for pushing new data to the watch. As examples, the refresh preferences can be determined by display manager 340 and/or WSD 329.

At block 454, a trigger can be received by the companion. In various embodiments, the trigger can be a periodic trigger generated by a system routine on the companion (e.g., a watch communications daemon) or by the companion application. As another example, the companion application can receive a push from the server when new data occurs (e.g., a new score happens). This new score can act as a trigger to send new complication data to the watch. Such uses for when a new score happens may be suitable for certain sports with low-scoring, such as soccer and hockey, and potentially football. Updating only when there is a score can save battery life, compared to periodic refreshes. Even with scoring updates, updates may be provided at certain times, e.g., at end of quarters or at halftime.

At block 456, new complication data can be obtained. The new data can be obtained in a variety of ways. The new data can be obtained (e.g., by companion application 312) from a server after the trigger has been received, e.g., when the trigger is a periodic, internal trigger. The new complication data can also be received as a push from a corresponding server (e.g., a server a user has subscribed to for push notifications), where a notification of the new data can act as a trigger.

At block 458, the companion determines whether the new data can be sent for the particular companion application. This determination can be made by various modules, e.g., by a watch communications daemon (WCD). The WCD can track which watch applications are running, e.g., by tracking which complications are being used on an active watch face. If an active watch complication corresponds to the companion application providing the new data, then the WCD can determine if it is suitable to send the new data. The WCD can manage the number of updates to ensure that the number of updates does not violate any policy limits for updating complications.

In some embodiments, WCD can wait until the watch initiates communication with the companion, and then send any new data. In this manner, the companion knows that the watch is awake and there is no concern about having to wake the watch up with a push. In other embodiments, a push can be allowed, e.g., for a companion application or messages flagged as special. When a message is flagged as special, the companion can know that the message can be pushed to the watch to wake up the corresponding watch application, e.g., when a corresponding complication is active on a watch face.

At block 460, the new data is sent to the watch, e.g., as in block 412.

At block 462, the complication is updated, e.g., as in block 414.

In one example, a companion application can be budgeted to send 30 or 40 (or other number) updates to the watch per day. If a companion application knows that there is a particular window of activity (e.g., for a sports game), the companion application can budget updates to allow for more updates during the window. A weather application, however, might spread updates evenly across the entire day.

D. Providing Watch Information to Companion

Watch information can also be sent to the companion. A user might specifically request data to be sent to the companion. As another example, background modes can be used to queue up content that will be delivered to the companion at some time. This may occur when the watch is generating content, and once the data is queued up, that content can be transferred over to the companion. For example, if the watch was tracking health data, the watch can have some sort of process for determining when it is appropriate to send over the data. Such a process can be managed by WSD 329.

E. Budgets

CSD 319 and WSD 329 can use budgets for determining what actions are to be performed by the companion and the watch. As examples, there can be three budgets involved for communications between the devices. There is how many messages can be sent in one day in total between a server and the companion, for a particular application, and for a particular type of message (e.g., push by a server or a request from the companion). Another class of budget is how many times the system chooses to launch an application in the background, e.g., to obtain new data or process the new data. Another class of budget is how many times messages can be sent between the companion and the watch in one day in total between the watch and the companion, for a particular application, and for a particular type of message (e.g., push by companion or a request from the watch).

As an example, for a weather application, it may only need to check at certain times, e.g., 9:00 a.m. because that is when the user wakes up. But, the weather application may want to update every hour, but that may be too much for the budget determined by a sampling daemon. In some embodiments, there can be a hybrid model where an application wants to update every half an hour, but the application also wants to be able to receive pushes. A budget can be tracked across both devices, e.g., a complication budget for actions on both devices.

If a budget is used up, certain updates at the end of the day may not be sent. For example, if an application wants an update every 10 minutes, then towards the end of that day, the budget may be used up. Further, the messages at the end of the day may not be allowed to be high priority because they consumed the budget doing the scheduled update.

CSD 319 can determine whether a message is to be sent based on the budget, e.g., whether a message is sent through WCD 316. The message can go through immediately when CSD approves, but otherwise the message can be queued, e.g., in queue 317. Or, the message can be dropped and the companion application can try later.

III. Time-Travel Mode

A user may want to view data relating to times other than the current time. For example, the user might want to view the weather forecast for the next few hours, or the next few days. However, it can be difficult to view a list of forecasted temperatures on a reduced screen of a watch, particularly if such forecasts are to be displayed as complications on a watch face. Therefore, embodiments can allow a user to scroll through complication data corresponding to various times to see historical and/or future complication data. Such a mode can be referred to as a time-travel mode or as a time scrubbing mode.

Embodiments can enter a time-travel mode in various ways, such as by moving or pushing a digital crown or pushing on a screen of the watch for a particular duration, with a specified amount of force, and/or at a specified time. Once a watch face enters a time-travel mode, the user interface (UI) can change to allow a user to browse through such historical and/or future complication data. A time-travel UI can show a current time as well as an indicator of the past/future time (e.g., via an offset time and/or the other time). Further, other aspects of the watch can change, such as color, font type, or font size. The size of the current time can become smaller, with the travel time larger.

In some embodiments, all the complications on a watch face can show complication data corresponding to the selected past/future time, or at least all that support a time-travel mode. Historical/future data can be stored for each of the complications, and such data can be accessed by the time-travel mode. The historical/future times can vary for the different complications. Thus, each complication can have its own custom behavior for changing at different past/future times.

Figure 5A:
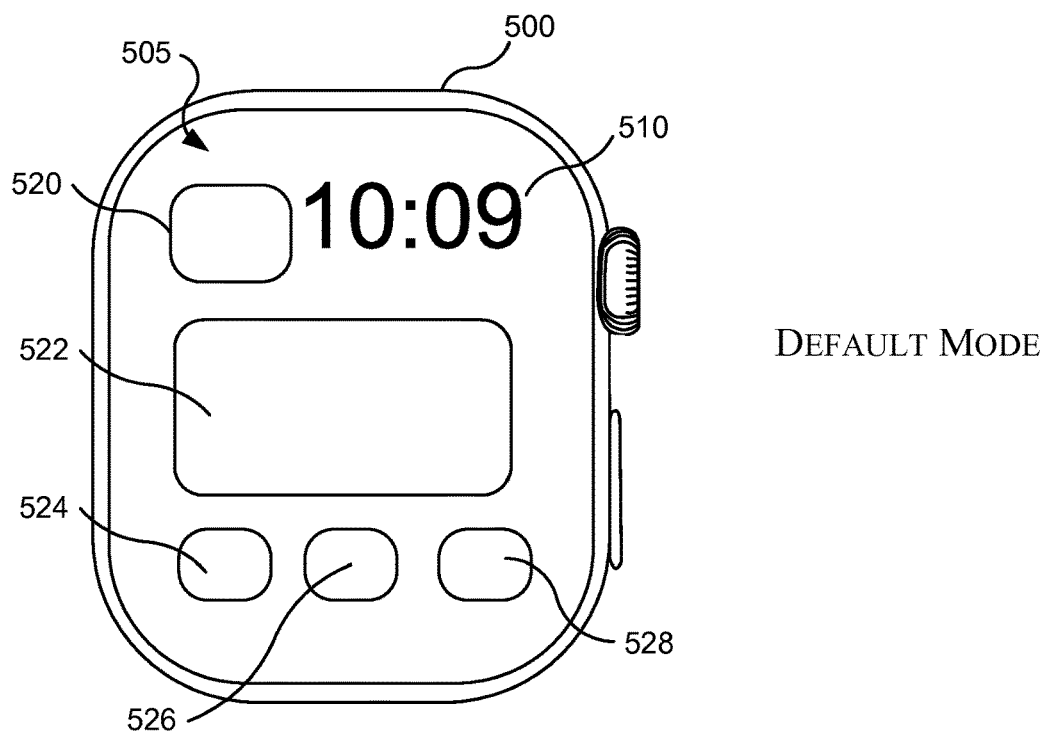
FIG. 5A shows a watch face of an electronic watch in a default mode according to embodiments of the present invention.

FIG. 5A shows a watch face 505 of an electronic watch 500 in a default mode according to embodiments of the present invention. The default mode corresponds to the layout that is normally displayed for the selected watch face. A modular watch face is shown with time window 510 showing time 10:09. Data windows 520-528 are shown to illustrate where complication data would be displayed. Data windows 520-528 can correspond to the style windows that were configured for watch face 505, e.g., as described for FIG. 2. Thus, the windows can correspond to style windows when a watch face is being configured and correspond to data windows when complications are being displayed.

Figure 5B:
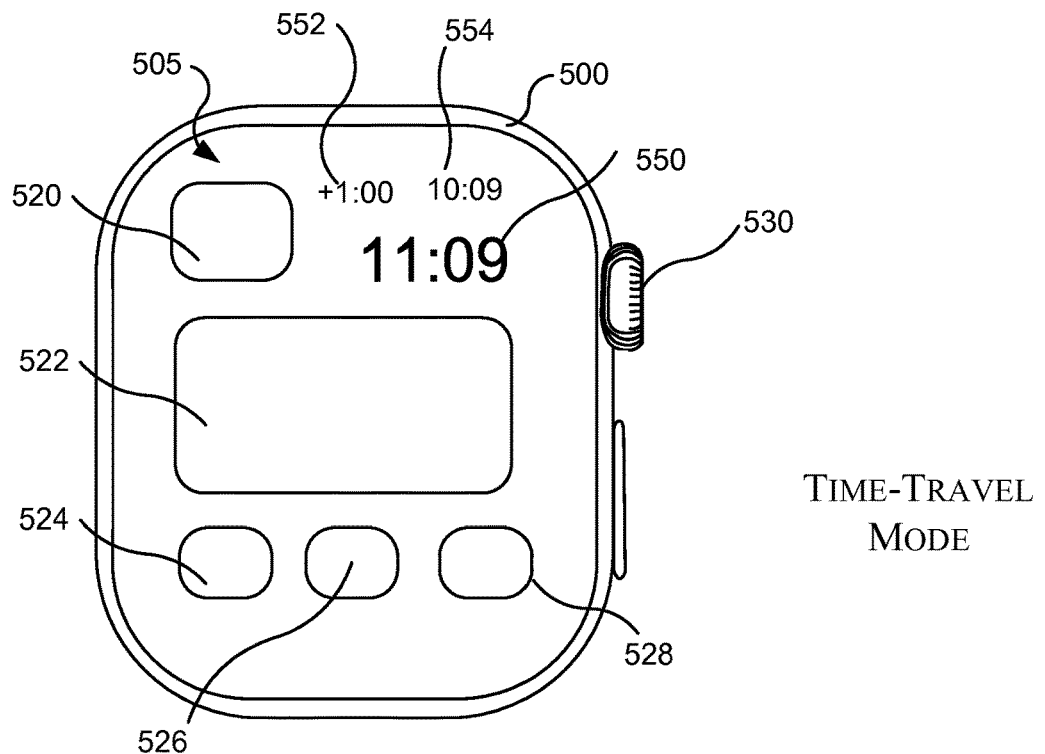
FIG. 5B shows a watch face of the electronic watch in a time-travel mode according to embodiments of the present invention.

FIG. 5B shows the watch face 505 of electronic watch 500 in a time-travel mode according to embodiments of the present invention. A current time window 554 shows a current time 10:09. Current time window 554 is smaller than time window 510, as a result of entering the time-travel mode. Various sizes for the windows may be used in various embodiments.

Travel time window 550 shows the past/future time 11:09 selected by a user to show historical/future complication data. Offset window 552 shows a time difference+1:00 (also called an offset time) between the past/future time 11:09 of travel time window 550 and the current time 10:09 of current time window 554. For example, digital crown 530 can be moved to select a new time for travel time window 550. In some implementations, the user does not need to actively confirm the desired past/future time is to be used to update the complication data, and the complication data can be updated as the user scrolls through time. In other implementations, once a desired past/future time is in travel time window 550, the display of historical/future data in the complications requires activation, which can be done in various ways, e.g., by pushing in digital crown, tapping on the screen, or swiping on the screen.

Once the travel time is selected, the complications can be updated from data stored at electronic watch 500. For example, data records for various times can be stored in a memory (e.g., memory 342 of FIG. 3) of electronic watch 500. The memory may be a cache for a processor of the watch, and thus the data may be retrieved quickly for displaying in a complication as the travel is changed.

A. Viewing Historical Data

Example historical data might include previous events in the calendar, stock quotes, weather (e.g., temperature or sky conditions, such as sunny, cloudy, and rain). The last ten hourly temperatures for a day can be stored at the watch. A user can then scroll back in time, and when the travel time is close to or at the corresponding past hourly time, the corresponding temperature can be provided.

As another example, a calendar event application might store the last 10 events. When the travel time is scrolled back, a user can see information about a most recent meeting, and then scroll back further to see information about even earlier meetings. For a stock application, previous values of a particular stock could be viewed at various times. The previous times could have a uniform scale or a non-uniform scale. For example, 5 previous stock values can be provided for each of the last 10 minutes, then the stock price for each of the last five days, then the stock price for the last month, for three months ago, six months ago, one year ago, and two years ago, or any variation thereof.

B. Viewing Future Predictions (Forecasts)

In some embodiments, only certain applications might be able to provide future times. For example, a stock application would likely not provide future values, although consensus predictions might be possible. Future scores of a game would likely not be possible. However, forecast for future weather conditions may be provided. Thus, certain complications may be dimmed (or other indication of an inactive state) when the travel time goes into the future, as the complication does not have any future data.

As with the historical data, the future data can be stored corresponding to future times. When a future time is selected for the travel time, a corresponding future weather condition can be retrieved and provided to the user. For example, if the travel time is 10:50, a forecast corresponding to 11:00 can be provided.

C. Example Screenshots

Figure 6A:
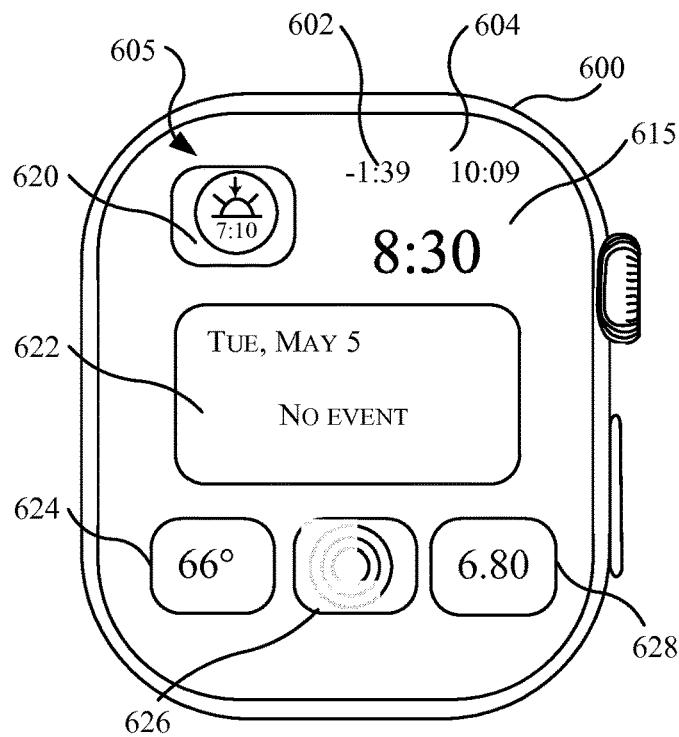
FIG. 6A shows a watch face of an electronic watch in a time-travel mode with a selected past time according to embodiments of the present invention.

FIG. 6A shows a watch face 605 of electronic watch 600 in a time-travel mode with a selected past time according to embodiments of the present invention. A current time window 604 shows a current time of 10:09. Travel time window 615 shows a historical time of 8:30, as may be selected by a user. Offset window 602 shows a negative time difference (−1:39) to indicate that the selected time 9:30 is before the current time 10:09.

In response to 8:30 being selected, data windows 620-628 can show complication data corresponding to the historical time of 8:30. If data window 620 shows a date or sunrise time for the day, the complication in data window 620 would not change. An example of a sunrise complication is shown as the same as in complication 110 for FIG. 1A to signify no change. In an example where data window 622 shows calendar of events, information about an event at 8:30 can be shown, if one existed. As shown, there are no events for 8:30, and thus data window 622 shows "No Event." Data window also shows a current date. The boxes of data windows 620-628 are provided as a frame of reference, and may not be actually displayed.

In data window 624, the outside temperature at 8:30 can be shown. As shown the temperate is 66°, which is higher than at 6:33, as shown in FIG. 1B. Such data can be retrieved from another device (e.g., a companion) when a time-travel mode is entered. In another example, such data can be retrieved from memory to the extent that such data is already stored on the watch. For example, the temperature can be received periodically during the data and saved for later retrieval, if a user enters a time-travel mode.

In data window 626, the activity of the user at 8:30 can be shown. As shown, the amount of activity is less than the activity shown in FIG. 1B for complication 166. The activity tracked, e.g., during a day, can be stored in a memory on the watch at periodic times for later retrieval. Thus, the complication data for historical/future times does not need to be obtained from another device, but may be generated by the watch and stored locally.

In data window 628, historical price 6.80 of a stock can be provided. This historical data may have been received at previous times during the day and stored in memory. Thus, the complication data (e.g., historical prices) may be received as separate messages throughout a day, and be stored for later retrieval. In other embodiments, complication data can be retrieved in a single batch of multiple entries, each entry corresponding to a different time.

Figure 6B:
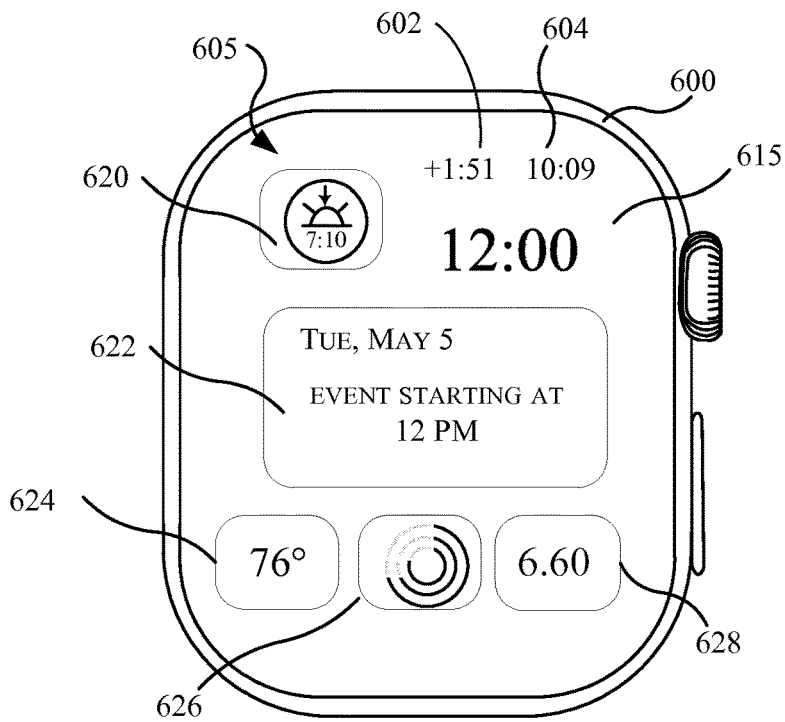
FIG. 6B shows the watch face of the electronic watch in a time-travel mode with a selected future time according to embodiments of the present invention.

FIG. 6B shows the watch face 605 of electronic watch 600 in a time-travel mode with a selected future time according to embodiments of the present invention. Travel time window 615 shows 12:00, which has an offset+1:51 in offset window 602. The complications in data windows 620-628 may or may not have changed depending on whether there is different complication data for the future time 12:00 in travel time window 615.

For data window 620, the sunrise complication has not changed as the sunrise for the same day still occurred at 7:10. In some embodiments, the sunrise complication can be a sunrise/sunset complication that changes from showing sunrise to sunset at some point in the day. With such functionality, the complication in data window 620 could change to show a sunset icon with the sunset time, once the future time reaches a certain value, e.g., times later than 12:00. If the travel time went to a different day, the sunset icon can change as the sunrise time would change.

In data window 624, the outside temperature at 12:00 is shown to be 76°, which is higher than the temperature in FIG. 1A, as 12:00 is later in the day than 10:09. In data window 626, the activity of the user at 12:00 is shown with more activity than at 8:30 of FIG. 6A and more activity than at 10:09 in FIG. 1A. In data window 628, the stock price of 6.60 is shown. This price may correspond to a price at 10:09, and the price may stay the same as there is not a future stock price available. The price is shown dimmed to indicate that the price is not valid at the selected future time.

D. Method

Figure 7:
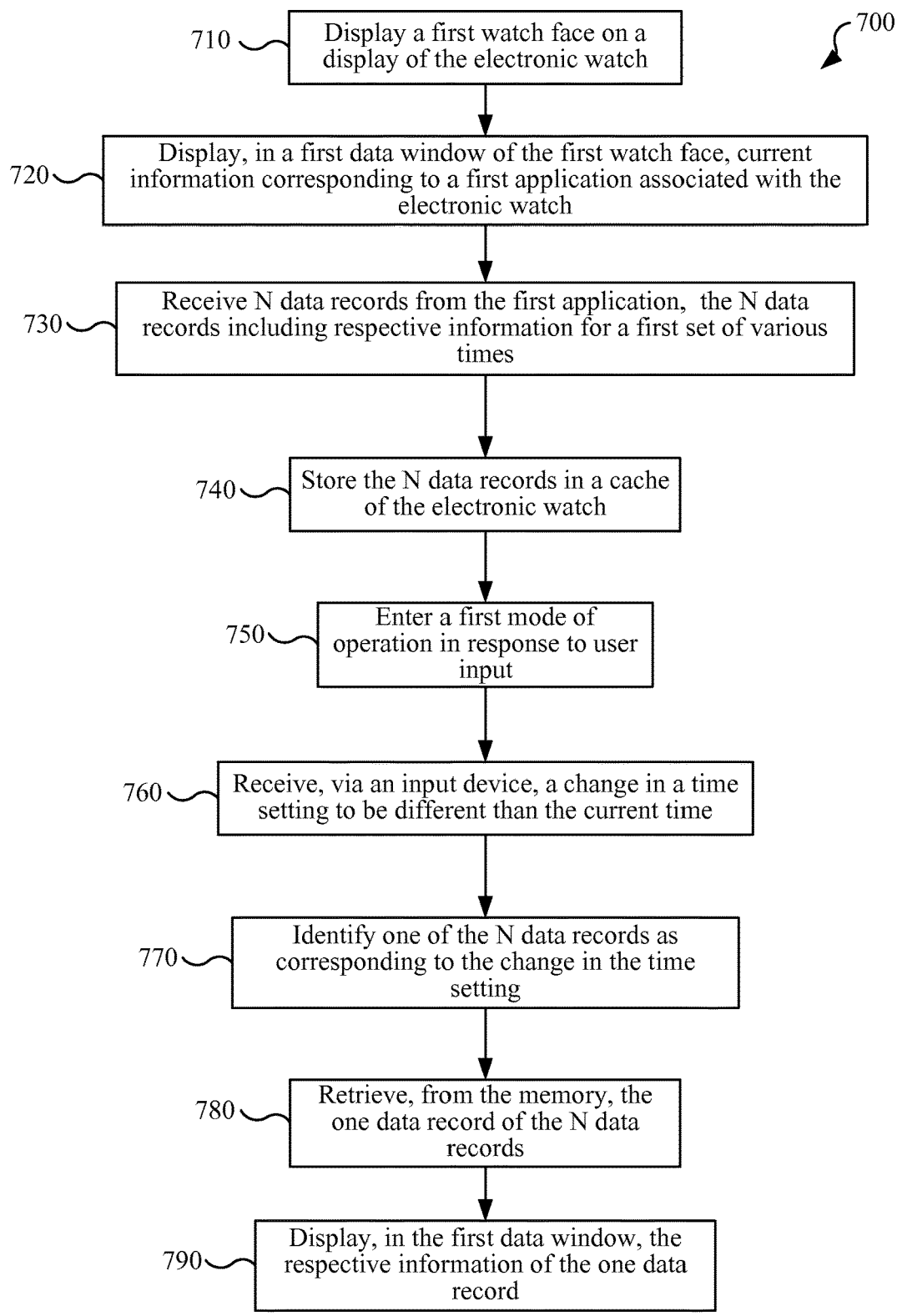
FIG. 7 shows a flowchart of a method for displaying information on an electronic watch for times other than a current time according to embodiments of the present invention.

FIG. 7 shows a flowchart of a method 700 for displaying information on an electronic watch for times other than a current time according to embodiments of the present invention. Method 700 can be performed entirely by the electronic watch, e.g., by hardware and/or software of the electronic watch.

At block 710, a first watch face is displayed on a display of the electronic watch. The first watch face includes one or more data windows for providing other information over time. The data windows can be for displaying applications on a watch face. The data windows can correspond to style windows that are used to configure templates for displaying complications. But, the data windows may not necessarily correspond to such style windows, particularly if templates are not used.

At block 720, current information corresponding to a first application associated with the electronic watch is displayed in a first data window of the first watch face. The current information corresponds to a current time. For example, the current information may be for a time that is near the current time. For instance, information may have been received at 11:00 AM, and the current time may be 11:15 AM, and no newer information has been received since. Thus, the information at 11:00 AM corresponds to 11:15 AM. Thus, the current information can be any information that is displayed at the current time. The first application is configured to provide time-dependent information.

The first application can be running on the watch or on a companion. For example, the first application can be a companion application (including any extensions) running on a companion device. As another example, the first application can correspond to a watch application running on the watch, and the watch application can provide information for displaying in the first data window. In one embodiment, the watch application can run code from a developer in an extension, and the system can provide code that ensures data from the developer's code is interpreted properly by system modules, such as a display manager.

At block 730, N data records are received from the first application. Each of the N data records include respective information for a first set of various times, where N is an integer greater than one. The N data records may be received at different times, e.g., each received as current information at a current time, but becoming historical information at later times. Thus, at least two of the N data records can be received at different times. In some embodiments, the N data records can be received by a display manager (e.g., display manager 340 of FIG. 3). Each of the N data records can include a complication data object that is defined according to a template.

At block 740, the N data records are stored in a memory of the electronic watch. The memory may be of various types. For example, the memory may be a persistent memory store, such as flash memory. As another example, the memory can be operating memory used for executing processes. Thus, the memory to correspond to a cache of the watch device.

At block 750, a first mode of operation can be entered in response to user input. The first mode (e.g., a time-travel mode) can allow a user to view the respective information from the first application for different times. In some implementations, the respective information can be viewed serially, e.g., by a user scrolling through various times within a time period from a starting time to an ending time and having corresponding information being displayed for a plurality of times in between.

At block 760, an input device of the electronic watch can receive a change in a time setting to be different than the current time. For example, the user may be able to select a different time for displaying in a window normally used to display current time or for displaying in a separate window. For example, the user can change a current time in time window 510 and a selected time can be used to retrieve one of the N data records. As another example, the user can change travel time window 550 and a selected time can be used to retrieve one of the N data records. An example of an input device is a digital crown, although other input devices can be used, such as a touchscreen.

At block 770, one of the N data records can be identified as corresponding to the change in the time setting. For example, a data record having a closest time to the travel time can be retrieved for displaying in response to the travel time. Example techniques for identifying the corresponding data record are described in FIGS. 8 and 9.

At block 780, the one data record of the N data records is retrieved from the memory. If the memory is a cache for a processor of the watch, the one data record can be retrieved very quickly.

At block 790, the respective information of the one data record is displayed in the first window. The manner for displaying the respective information can be specified by the first application. For example, the first application can provide the respective information in a template form that specifies the particular display template for displaying the information. Accordingly, historical/future complication data corresponding to a first application can be retrieved from memory in response to a user specifying a particular time that is different than the current time, e.g., by entering a time travel mode and scrolling through travel times using a digital crown.

IV. Storage and Access of Historical and Future Information

Different applications can provide different amounts historical and/or future information. In some embodiments, an application can determine how much information to provide. For example, an application can determine time ranges for which interesting pieces of information are known (e.g., times when the complication data would change). Thus, an application can determine which historical/future data is relevant to provide. Applications can also provide historical/future data at appropriate times.

For example, the first application for a first complication might provide data for five minutes ago, 15 minutes ago, and 20 minutes ago because those are the times that data has changed. A second application for a second complication, however, might provide data for 5, 10, 15, and 20 minutes ago. Thus, if the travel time was scrolled from 0 to 20 minutes in the past, the first complication would display three different values as the travel time changes, whereas the second complication would show four different values.

Some applications may have very little data within a given time. For example, a birthday application might not have any new or changed information for the last 24 hours or longer, as such application might have only a last birthday for someone on a list.

Accordingly, some embodiments do not simply toggle through each piece of historical data in succession for each complication as an input device (e.g. a digital crown) is moved by incremental amounts. Instead, embodiments can store a time associated with each piece of data for a particular complication, and then determine which data should be shown based on the travel time and the corresponding times of the historical/future data.

A. Storage

Figure 8:
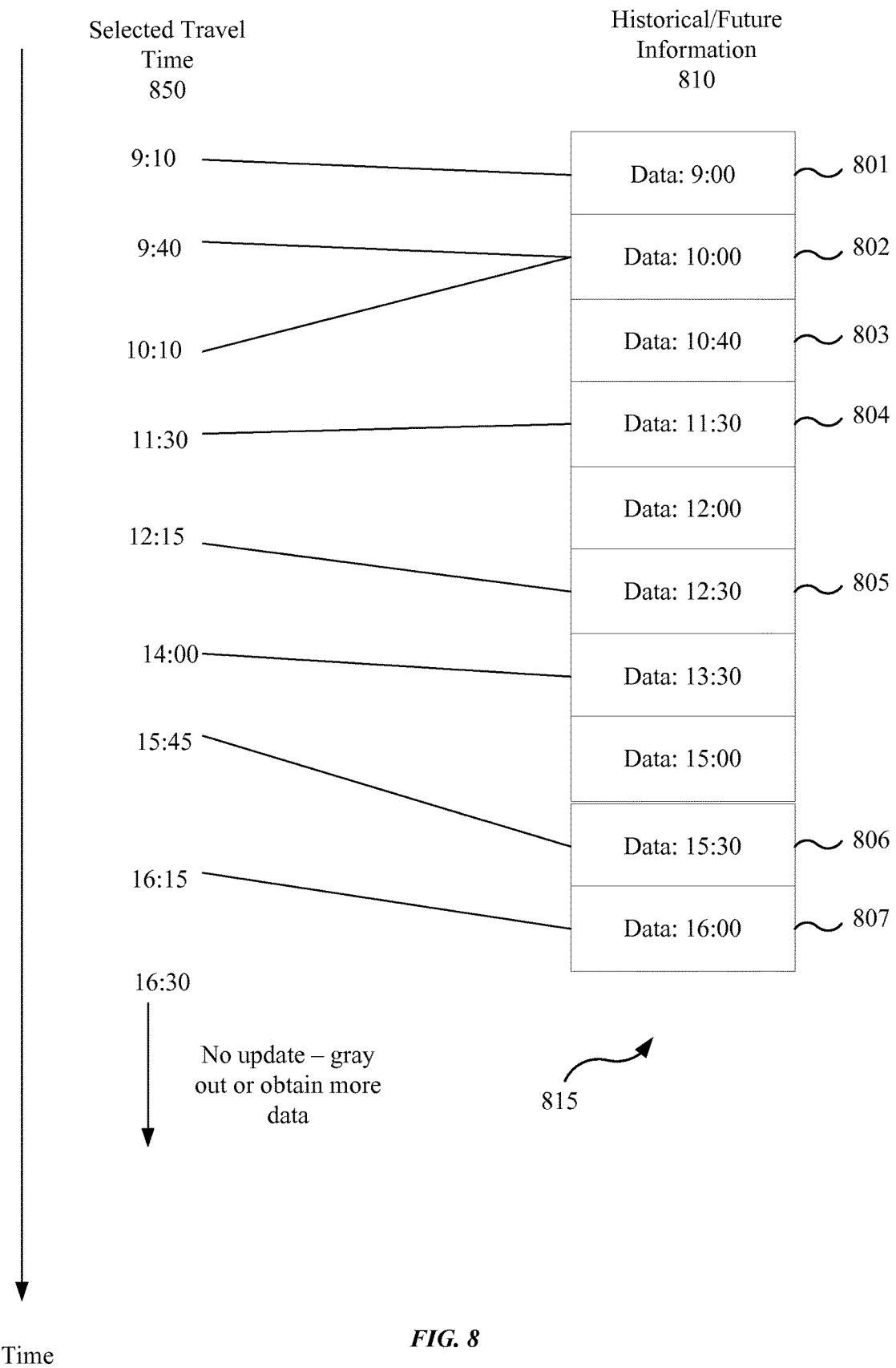
FIG. 8 shows a diagram illustrating storage of historical/future information for a particular complication at various times and the selection of which data to display for the particular complication according to embodiments of the present invention.

FIG. 8 shows a diagram illustrating storage of historical/future information for a particular complication at various times and the selection of which data to display for the particular complication according to embodiments of the present invention. FIG. 8 shows an array 815 of 10 entries of historical/future information 810. Each entry (data record) can include data and a corresponding time (e.g., a single time or a time range). The entries are shown in chronological order, but such a storage is not necessary. Searching array 815 can be more efficient if the entries are in chronological order. Although 10 entries are shown, any number of entries may be stored.

Array 815 may be obtained in various ways, e.g., as a request for a specified number of entries. Such a request may be specifically made for only one of historical and future data, for a specified number of entries of each, or total number for historical and future entries, which may include current information. In other embodiments, an application can provide any number of entries, e.g., by providing an array along with the number of entries of the array.

In some embodiments, a recommendation can be given to an application for an amount of data to provide. An application can provide more information, e.g., if the application naturally stores a higher density array of data points. The watch can receive such a higher density array but store a lower density array for the complication. For example, the travel time might allow incremental changes of a minimum resolution (1 or 5 minutes). Thus, the watch might not be able to provide complication data with any more precision than the minimum resolution, and thus it would be pointless to save the extra information. Thus, some of the complication data may be thrown out or used in a down sampling procedure (e.g., determining an average within a time window centered around the time for which data will be stored).

B. Determining which Data to Display

FIG. 8 also shows a list of selected travel times 850. The list is show increasing in time as one moves down the list. Once a time is selected, corresponding complication data is determined for a particular complication.

In some embodiments, a first selected time can be 9:10. A display manager can compare the first selected time to data entries for historical/future time associated with one or more complications on the watch face. For array 815 and a selected travel time of 9:10, a comparison can identify entry 801 corresponding to 9:00. The travel time may not always exactly match one of the historical/future times. In such a case, a variety of rules can be used, such as determining an entry with the closest time, determining an entry with the closest time before the travel time, or determining an entry at the closest time after the travel time.

For a selected travel time of 9:40, a closest time to correspond to entry 802, which provides complication data for 10:00. For a selected travel time of 10:10, the closest time entry also corresponds to entry 802. Thus, as the travel time changes from 9:40 to 10:10, the complication corresponding to array 815 would not change.

For a selected travel time of 11:30, an exact match does occur. In this example, the data for entry 803 does not get displayed when the selected time jumps from 10:10 to 11:30. In some embodiments, the display of the updated data can be provided in a continuous fashion, such that the selected travel time is scrolled from one value to another, and any new data is displayed as a new value is scrolled to on the display. For example, a digital crown can be scrolled continuously to obtain different travel times with the prescribed resolution, which may be smaller for slower scrolling and larger for faster scrolling. In such embodiments, array 815 can be stored in a cache for quick retrieval and display.

In other embodiments, the selected times can jump from one value to another or be specifically selected (e.g., updated complication data is not displayed for just any value displayed). In some embodiments, a selected time may lie in between two entries. A rule could be applied to choose either a past or future time. For the example of a travel time 12:15, an entry 805 corresponding to 12:30 is selected. For the example of a travel time 15:45, an entry 806 corresponding to 15:30 is selected. If a rule was to select the closest earlier time, then a travel time 12:15 can result in the entry for 12:00 to be provided.

In the example shown in FIG. 8, travel time 16:15 does select an entry that is the last entry of array 815, even though 16:15 is after 16:00. In various embodiments, for later travel times, such as 16:30, the data for entry 807 can remain, the complication can go blank, or the complication can be grayed out (dimmed), potentially with data for entry 807 remaining A last entry in array 815 can be labeled (e.g., as "end time" or "end date"), and thus an end of the data can be identified. Similarly, a first entry (e.g., entry 801) can be labeled as the start time. Any label signifying a start or an end can be used. For example, an array identifier (e.g., a number) can be used based on a size of the array, e.g., array element 50 is known to be the last in an array of size 50, whereas 1 is known to be first. Additionally, embodiments can request more data for later times. Such a request can be made as a selected travel time nears the time of the last entry (e.g., at 14:00 in this example).

Some embodiments can have a visibility window for determining when to show updated complications data, particularly when the travel time includes the date. Using an alarm as an example, a next alarm may not be set until Friday, but the travel time is on previous Tuesday. The alarm on Friday may not be shown until the travel time is within 24 hours, so as to avoid confusion and also provide information when most useful to a user. And, for birthdays, one would not want to show birthdays that do not correspond to the date of the travel time. As another example, the updated data may only appear once travel time is past midnight of the day of the birthday. Accordingly, different criteria can be used to identify a matching entry of the corresponding array for different complications.

In some implementations, an application can specify the rules to be used for identifying which entries to use. For example, an application can choose one of the plurality of predetermined rules to use, e.g., one of those mentioned herein. The system software of the watch can have each of the predetermined rules already encoded.

Further, an application can have a default screen when no information is relevant, e.g., respectively saying that no birthdays, events, or alarms for that day, depending on the application being used. In other instances, a last value can be displayed until being replaced by a new value. For example, data for entry 801 can continue to be displayed until the corresponding time is reached for entry 802.

The data can be retrieved from memory when a particular time is selected. In some implementations, the data can be stored in a separate memory module (for storing data for longer periods) and then retrieved when a time-travel mode is activated. The data can be retrieved and stored in a local cache (an example of the type of memory) for quick processing when the time-travel mode is entered.

C. Multiple Complications

The determination of which entry in an array of historical/future information can be made for multiple complications. Such determinations can be made in a similar manner as for FIG. 8.

Figure 9:
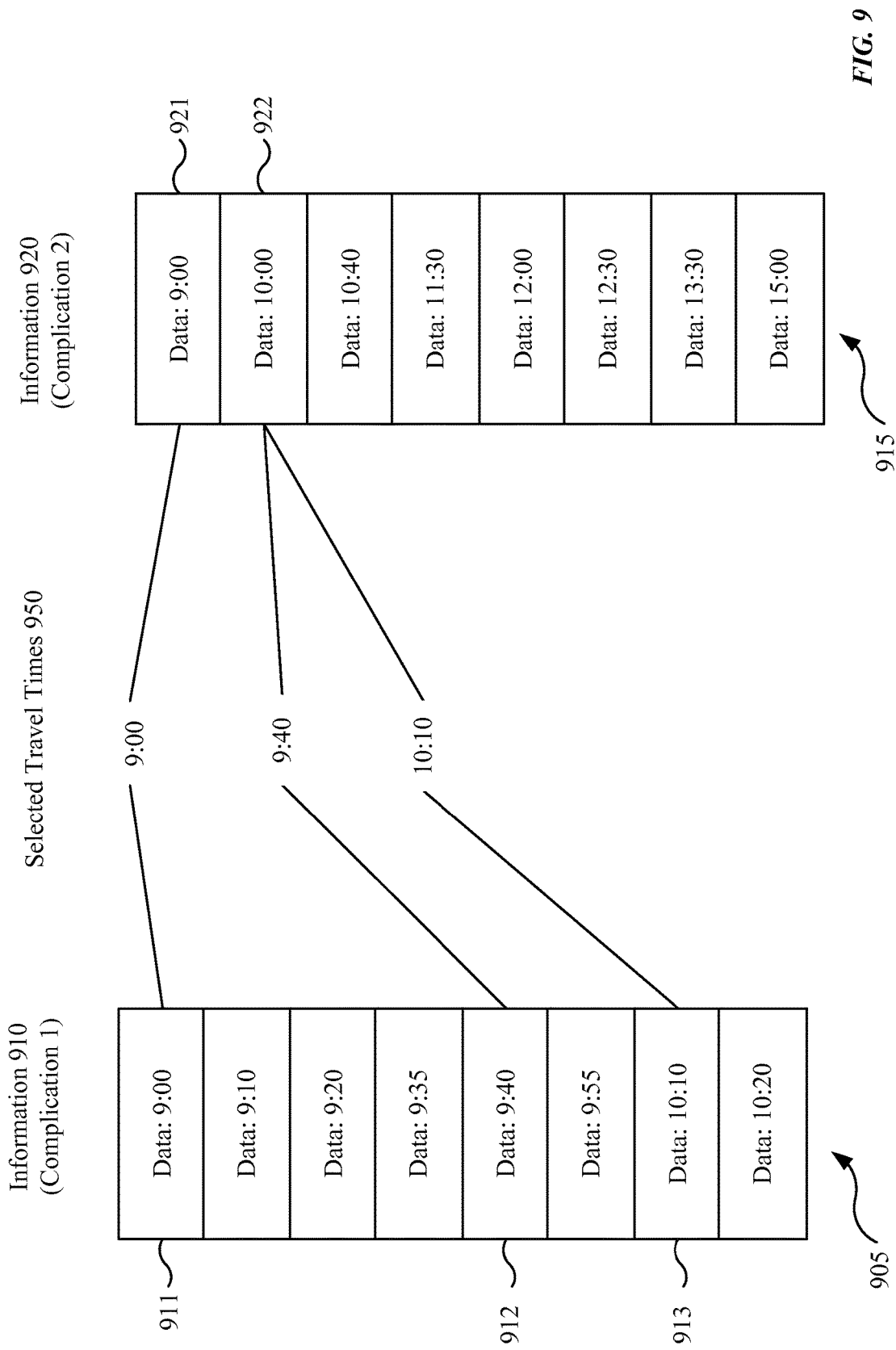
FIG. 9 shows a diagram illustrating the selection of which data to display for two complications according to embodiments of the present invention.

FIG. 9 shows a diagram illustrating the selection of which data to display for two complications according to embodiments of the present invention. Array 905 stores information 910 for complication 1, and array 915 stores information 920 for complication 2. The selection of various data entries is shown for different selected travel times 950. As one can see, the two complications have different densities of information. Array 905 has data in smaller increments of time than array 915. Accordingly, a last entry of array 905 has an earlier time (10:20) than array 915.

For travel time 9:00, entry 911 of array 905 is selected, and entry 921 of array 915 is selected. Both of these entries are the first entry in the respective arrays. But, for a next travel time of 9:40, entry 912 is selected from array 905, and entry 922 is selected from array 915. Thus, the fifth entry is selected for complication 1, but the second entry is selected for complication 2. If the travel time was changed continuously from 9:10 to 9:40, complication 1 would have changed four times, while complication 2 would have changed only once. For travel time 10:10, entry 913 is selected from array 905, but entry 922 is still selected for array 915.

In this manner, the data for all of the complications being shown correspond to the selected travel time. Thus, there is consistency.

V. Obtaining Historical and Future Information

As mentioned above, complication data can be requested by the watch or pushed to the watch. The complication data can include current values, as well as historical and/or future information. In various embodiments, the current values can be sent separately or at the same time as the historical/future information. More historical (or future) information might be requested when a user selects a travel time that exceeds the current set of historical/future information. Some complications might have certain limitations as to what type of data can be shown, e.g., a future stock value might not be able to be provided.

A. Requesting Data

In some embodiments, a watch may decide suitable times to request the historical/future data from another device. Such determination can be made by a watch sampling daemon (WSD), e.g., as described for FIG. 3. For example, the WSD can request the historical/future complication data when other data is being requested. Or, the WSD can determine that the watch is charging and no other communication is occurring, and thus the historical/future complication data can be requested with no or minimal impact on other processes. The WSD can even know that the other device (e.g., a companion) is in a charging state. The WSD can also request data if there has been no suitable opportunity to retrieve the historical/future for a certain amount of time, e.g., 24 hours.

A request from the watch can specify the type of data requested. For example, the request can specify whether only historical information is requested or only future information. The request can include a particular time window for which complication data is to be retrieved, e.g., information before a certain time or after a certain time. The request can specify how many entries are to be sent. Obtaining a block of N entries (e.g., 10 or 100) can avoid having to request for new data for each new travel time when the user is scrolling (or other type of selecting).

In embodiments where the watch requests current data from another device, the request for historical/future information can be sent at the same time or as part of the same request. In this manner, the watch can have the historical/future information when the user views the updated current information. Which data has previously been sent can be tracked so that the same data is not sent twice. If future information can change (e.g., a forecast has changed), then future information can be sent again, and the new future information can overwrite the old future information.

B. Pushing Data

In embodiments where another device pushes data to the watch, a decision of what complications data to send can be made by the other device, e.g., as described for FIG. 3. Similar to FIG. 4B, the watch can provide user preferences for which historical/future information is to be provided. The user preferences can be the same type as for current complication data.

Accordingly, a companion device can send the historical/future information with any current complication data (or separate from any current complication data). The companion device can use different policies (e.g., which and how much information to send) for different complications. For example, a sports application can be configured to provide scores for game in chunks at time, e.g., for quarter or half at a time. In this manner, the amount of communication can be minimized, thereby reducing battery usage.

In some embodiments, current complication data for an active complication can have high priority for being pushed to the watch. Historical/future complication data can have medium priority, and complication data for inactive complication can have low priority. Such priority can change based on which complications are active. In some implementations, only one message can be tagged as high priority for a particular companion application. Such a single message might have multiple data records for a complication.

C. Storing Data as Received

In some embodiments, a watch can receive current complication data at a plurality of times. This current complication data can be stored in memory and become historical information once time passes and new complication data is received. In this manner, the historical information can be readily available when a user enters a time travel mode.

D. Variation on Location

If the user was at a different location at a historical time, the watch may not have that historical information. Thus, a request can be made to obtain that historical information at the current location of the user. In other embodiments, the historical information at the location where the user is currently located can be used.

VI. Example Devices

Figure 10:
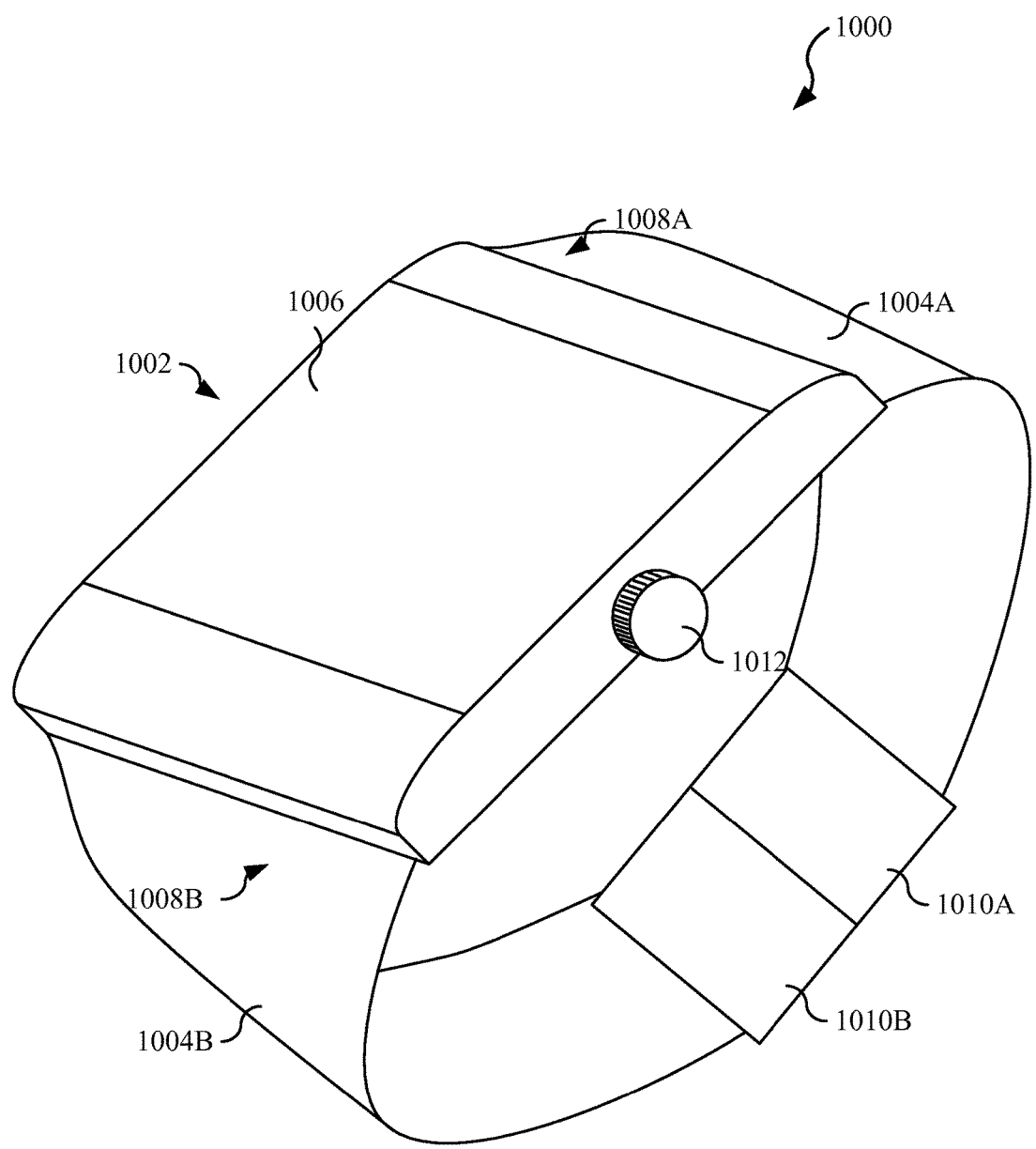
FIG. 10 shows a wearable watch device according to embodiments of the present invention.

Embodiments described herein may take the form of, be incorporated in, or operate with a suitable electronic device, e.g., companion devices or a watch device. One example of such a device is shown in FIG. 10 and takes the form of a wearable watch device. Alternative embodiments of suitable electronic devices include a mobile phone, a tablet computing device, a portable media player, and so on. Still other suitable electronic devices may include laptop/notebook computers, personal digital assistants, touch screens, input-sensitive pads or surfaces, and so on.

FIG. 10 shows a wearable watch device 1000 according to some embodiments of the present invention. In this example, wearable device 1000 is shown as a wristwatch-like device with a face portion 1002 connected to straps 1004A, 1004B. In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Face portion 1002 can include, e.g., a touchscreen display 1006 that can be appropriately sized depending on where on a user's person wearable device 1000 is intended to be worn. A user can view information presented by wearable device 1000 on touchscreen display 1006 and provide input to wearable device 1000 by touching touchscreen display 1006. In some embodiments, touchscreen display 1006 can occupy most or all of the front surface of face portion 1002.

Straps 1004A, 1004B can be provided to allow wearable device 1000 to be removably worn by a user, e.g., around the user's wrist, and secured thereto. In some embodiments, straps 1004A, 1004B can be made of any flexible material (e.g., fabrics, flexible plastics, leather, chains or flexibly interleaved plates or links made of metal or other rigid materials) and can be connected to face portion 1002, e.g., by hinges. Alternatively, straps 1004A, 1004B can be made of a rigid material, with one or more hinges positioned at the junction of face 1002 and proximal ends 1008A, 1008B of straps 1004A, 1004B and/or elsewhere along the lengths of straps 1004A, 1004B to allow a user to put on and take off wearable device 1000. Different portions of straps 1004A, 1004B can be made of different materials; for instance, flexible or expandable sections can alternate with rigid sections. In some embodiments, one or both of straps 1004A, 1004B can include removable sections, allowing wearable device 1000 to be resized to accommodate a particular user's wrist size. In some embodiments, straps 1004A, 1004B can be portions of a continuous strap member that runs behind or through face portion 1002. Face portion 1002 can be detachable from straps 1004A, 1004B; permanently attached to straps 1004A, 1004B; or integrally formed with straps 1004A, 1004B.

The distal ends of straps 1004A, 1004B opposite face portion 1002 can provide complementary clasp members 1010A, 1010B that can be engaged with each other to secure the distal ends of straps 1004A, 1004B to each other, forming a closed loop. In this manner, device 1000 can be secured to a user's person, e.g., around the user's wrist; clasp members 1010A, 1010B can be subsequently disengaged to facilitate removal of device 1000 from the user's person. The design of clasp members 1010A, 1010B can be varied; in various embodiments, clasp members 1010A, 1010B can include buckles, magnetic clasps, mechanical clasps, snap closures, etc. In some embodiments, one or both of clasp members 1010A, 1010B can be movable along at least a portion of the length of corresponding strap 1004A, 1004B, allowing wearable device 1000 to be resized to accommodate a particular user's wrist size.

Straps 1004A, 1004B can be two distinct segments, or they can be formed as a continuous band of an elastic material (including, e.g., elastic fabrics, expandable metal links, or a combination of elastic and inelastic sections), allowing wearable device 1000 to be put on and taken off by stretching a band formed by straps 1004A, 1004B. In such embodiments, clasp members 1010A, 1010B can be omitted.

Straps 1004A, 1004B and/or clasp members 1010A, 1010B can include sensors that allow wearable device 1000 to determine whether it is being worn at any given time. Wearable device 1000 can operate differently depending on whether it is currently being worn or not. For example, wearable device 1000 can inactivate various user interface and/or RF interface components when it is not being worn. In addition, in some embodiments, wearable device 1000 can notify a companion device (e.g., a smartphone, a mobile device, a tablet device, a media player, a speaker, or other electronic devices) when a user puts on or takes off wearable device 1000.

In various embodiments, wearable device 1000 includes a rotary input such as a crown 1012 (also referred to as digital crown throughout the specification). Crown 1012 can be used to perform a variety of functions. In some embodiments, crown 1012 provides rotation input for navigating content (e.g., zooming in and out of content, panning across content). In this example, crown 1012 includes a plastic or metal crown body, preferably having conventional outer teeth. Typically, a pedestal made integral with the body of crown 1015 is positioned and protrudes into face portion 1002. Crown 1012 may be fastened, either permanently or removably, to hardware associated with wearable device 1000. Rotation of the crown (and/or a stem) may be sensed optically, electrically, magnetically, or mechanically. Further, in some embodiments the crown (and/or stem) may also move laterally, thereby providing a second type of input to the device.

Wearable device 1000 may likewise include one or more buttons (not shown here). The button(s) may be depressed to provide yet another input to the device. In various embodiments, the button may be a dome switch, rocker switch, electrical contact, magnetic switch, and so on. In some embodiments the button may be waterproof or otherwise sealed against the environment.

It will be appreciated that wearable device 1000 is illustrative and that variations and modifications are possible. For example, wearable device 1000 can be implemented in any wearable article, including a watch, a bracelet, a necklace, a ring, a belt, a jacket, or the like. In some instances, wearable device 1000 can be a clip-on device or pin-on device that has a clip or pin portion that attaches to the user's clothing. The interface portion (including, e.g., touchscreen display 1006) can be attached to the clip or pin portion by a retractable cord, and a user can easily pull touchscreen display 1006 into view for use without removing the clip or pin portion, then let go to return wearable device 1000 to its resting location. Thus, a user can wear wearable device 1000 in any convenient location.

Wearable device 1000 can be implemented using electronic components disposed within face portion 1002, straps 1004A, 1004B, and/or clasp members 1010A, 1010B.

Figure 11:
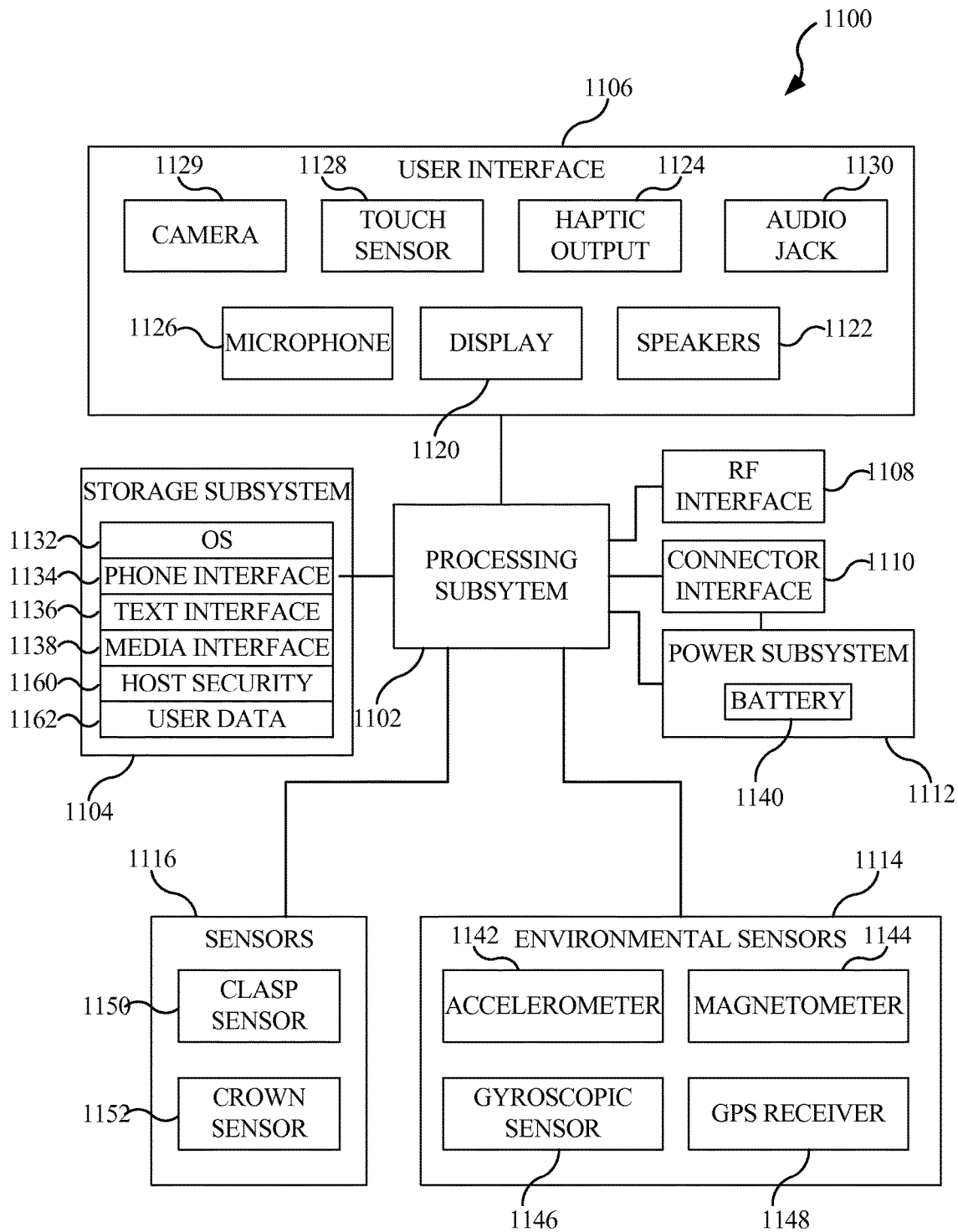
FIG. 11 is a simplified block diagram of an example companion or watch device according to embodiments of the present invention.

FIG. 11 is a simplified block diagram of a device 1100 (e.g., wearable device 1000 or a companion device) according to an embodiment of the present invention. Wearable device 1100 can include processing subsystem 1102, storage subsystem 1104, user interface 1106, RF interface 1108, connector interface 1110, power subsystem 1112, environmental sensors 1114, and strap sensors 1116. Wearable device 1100 can also include other components (not explicitly shown).

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Storage subsystem 1104 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 1104 can store media items such as audio files, video files, image or artwork files; information about a user's contacts (names, addresses, phone numbers, etc.); information about a user's scheduled appointments and events; notes; and/or other types of information, examples of which are described below. In some embodiments, storage subsystem 1104 can also store one or more application programs to be executed by processing subsystem 1102 (e.g., video game programs, personal information management programs, media playback programs, interface programs associated with particular host devices and/or host device functionalities, etc.).

User interface 1106 can include any combination of input and output devices. A user can operate input devices of user interface 1106 to invoke the functionality of wearable device 1100 and can view, hear, and/or otherwise experience output from wearable device 1100 via output devices of user interface 1106.

Examples of output devices include display 1120, speakers 1122, and haptic output generator 1124. Display 1120 can be implemented using compact display technologies, e.g., LCD (liquid crystal display), LED (light-emitting diode), OLED (organic light-emitting diode), or the like. In some embodiments, display 1120 can incorporate a flexible display element or curved-glass display element, allowing wearable device 1100 to conform to a desired shape. One or more speakers 1122 can be provided using small-form-factor speaker technologies, including any technology capable of converting electronic signals into audible sound waves. In some embodiments, speakers 1122 can be used to produce tones (e.g., beeping or ringing) and can, but need not be, capable of reproducing sounds such as speech or music with any particular degree of fidelity. Haptic output generator 1124 can be, e.g., a device that converts electronic signals into vibrations; in some embodiments, the vibrations can be strong enough to be felt by a user wearing wearable device 1100 but not so strong as to produce distinct sounds.

Wearable device 1100 may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output.

Examples of input devices include microphone 1126, touch sensor 1128, and camera 1129. Microphone 1126 can include any device that converts sound waves into electronic signals. In some embodiments, microphone 1126 can be sufficiently sensitive to provide a representation of specific words spoken by a user; in other embodiments, microphone 1126 can be usable to provide indications of general ambient sound levels without necessarily providing a high-quality electronic representation of specific sounds.

Touch sensor 1128 can include, e.g., a capacitive sensor array with the ability to localize contacts to a particular point or region on the surface of the sensor and in some instances, the ability to distinguish multiple simultaneous contacts. In some embodiments, touch sensor 1128 can be overlaid over display 1120 to provide a touchscreen interface, and processing subsystem 1102 can translate touch events (including taps and/or other gestures made with one or more contacts) into specific user inputs depending on what is currently displayed on display 1120. In some embodiments, touch sensor 1128 can also determine a location of a touch on the cover glass. A touch sensor may be incorporated into or on the display stack in order to determine a location of a touch. The touch sensor may be self-capacitive in certain embodiments, mutual-capacitive in others, or a combination thereof.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

Camera 1129 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 1104 and/or transmitted by wearable device 1100 to other devices for storage. Depending on implementation, the optical components can provide fixed focal distance or variable focal distance; in the latter case, autofocus can be provided. In some embodiments, camera 1129 can be disposed along an edge of face portion 1002 of FIG. 10, e.g., the top edge, and oriented to allow a user to capture images of nearby objects in the environment such as a bar code or QR code. In other embodiments, camera 1129 can be disposed on the front surface of face member 1002 of FIG. 10, e.g., to capture images of the user. Zero, one, or more cameras can be provided, depending on implementation.

In some embodiments, user interface 1106 can provide output to and/or receive input from an auxiliary device such as a headset. For example, audio jack 1130 can connect via an audio cable (e.g., a standard 2.5-mm or 3.5-mm audio cable) to an auxiliary device. Audio jack 1130 can include input and/or output paths. Accordingly, audio jack 1130 can provide audio to the auxiliary device and/or receive audio from the auxiliary device. In some embodiments, a wireless connection interface can be used to communicate with an auxiliary device.

Processing subsystem 1102 can be implemented as any electronic device capable of processing, receiving, or transmitting data or instructions. Processing subsystem 1102 can include one or more integrated circuits. For example, processing subsystem 1102 may include one or more of: one or more single-core or multi-core microprocessors or microcontrollers, a central processing unit (CPU), an application-specific integrated circuit (ASIC), a digital signal processor (DSP), or additional combinations of such devices. In operation, processing subsystem 1102 can control the operation of wearable device 1100. In various embodiments, processing subsystem 1102 can execute a variety of programs in response to program code and can maintain multiple concurrently executing programs or processes. At any given time, some or all of the program code to be executed can be resident in processing subsystem 1102 and/or in storage media such as storage subsystem 1104.

Through suitable programming, processing subsystem 1102 can provide various functionality for wearable device 1100. For example, in some embodiments, processing subsystem 1102 can execute an operating system (OS) 1132 and various applications for interfacing with a host device, such as a phone-interface application 1134, a text-interface application 1136, and/or a media interface application 1138. In some embodiments, some or all of these application programs can interact with a host device, e.g., by generating messages to be sent to the host device and/or by receiving and interpreting messages from the host device. In some embodiments, some or all of the application programs can operate locally to wearable device 1100. For example, if wearable device 1100 has a local media library stored in storage subsystem 1104, media interface application 1138 can provide a user interface to select and play locally stored media items. Examples of interface applications are described below.

In some embodiments, processing subsystem 1102 can also execute a host security process 1160 that provides support for establishing and maintaining a verified communication session with a host device. A verified communication session can provide an enhanced level of security, and various operations of wearable device 1100 and/or a host device can be made conditional on whether a verified communication session between the devices is in progress. For instance, host security process 1160 can facilitate unlocking a host device when wearable device 1100 is present, depending on whether a verified session is in progress. User data 1162 can include any information specific to a user, such as identification information, user-specified settings and preferences, customized information (e.g., contacts, predefined text messages), and any other user-related data or content. In some embodiments, executing applications and processes can access user data 1162 to facilitate operations.

RF (radio frequency) interface 1108 can allow wearable device 1100 to communicate wirelessly with various host devices. RF interface 1108 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. RF interface 1108 can be implemented using a combination of hardware (e.g., driver circuits, antennas, modulators/demodulators, encoders/decoders, and other analog and/or digital signal processing circuits) and software components. In some embodiments, RF interface 1108 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 1108. Wearable device 1100 may wirelessly communicate with a sales terminal nearby, thus permitting a user to quickly and efficiently conduct a transaction such as selling, buying, or returning a good. Wearable device 1100 may use NFC technology to perform these and other functions.

Connector interface 1110 can allow wearable device 1100 to communicate with various host devices via a wired communication path, e.g., using Universal Serial Bus (USB), universal asynchronous receiver/transmitter (UART), or other protocols for wired data communication. In some embodiments, connector interface 1110 can provide a power port, allowing wearable device 1100 to receive power, e.g., to charge an internal battery. For example, connector interface 1110 can include a connector such as a mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from a host device in analog and/or digital formats.

In some embodiments, connector interface 1110 and/or RF interface 1108 can be used to support synchronization operations in which data is transferred from a host device to wearable device 1100 (or vice versa). For example, as described below, a user can customize certain information for wearable device 1100 (e.g., a "favorite" contacts list and/or specific predefined text messages that can be sent). While user interface 1106 can support data-entry operations, a user may find it more convenient to define customized information on a separate device (e.g., a tablet or smartphone) that has a larger interface (e.g., including a real or virtual alphanumeric keyboard), then transfer the customized information to wearable device 1100 via a synchronization operation. Synchronization operations can also be used to load and/or update other types of data in storage subsystem 1104, such as media items, application programs, and/or operating system programs. Synchronization operations can be performed in response to an explicit user request and/or automatically, e.g., when wireless device 1100 resumes communication with a particular host device or in response to either device receiving an update to its copy of synchronized information.

Environmental sensors 1114 can include various electronic, mechanical, electromechanical, optical, or other devices that provide information related to external conditions around wearable device 1100. Sensors 1114 in some embodiments can provide digital signals to processing subsystem 1102, e.g., on a streaming basis or in response to polling by processing subsystem 1102 as desired. Any type and combination of environmental sensors can be used; shown by way of example are accelerometer 1142, a magnetometer 1144, a gyroscope sensor 1146, and a GPS receiver 1148.

Some environmental sensors can provide information about the location and/or motion of wearable device 1100. For example, accelerometer 1142 can sense acceleration (relative to free fall) along one or more axes, e.g., using piezoelectric or other components in conjunction with associated electronics to produce a signal. Magnetometer 1144 can sense an ambient magnetic field (e.g., Earth's magnetic field) and generate a corresponding electrical signal, which can be interpreted as a compass direction. Gyroscopic sensor 1146 can sense rotational motion in one or more directions, e.g., using one or more MEMS (micro-electro-mechanical systems) gyroscopes and related control and sensing circuitry. Global Positioning System (GPS) receiver 1148 can determine location based on signals received from GPS satellites.

Other sensors can also be included in addition to or instead of these examples. For example, a sound sensor can incorporate microphone 1126 together with associated circuitry and/or program code to determine, e.g., a decibel level of ambient sound. Temperature sensors, proximity sensors, ambient light sensors, or the like can also be included. The ambient light sensor may permit the device to sense a brightness of its environment and adjust certain operational parameters accordingly. For example, wearable device 1100 may modify a brightness of a display in response to the sensed ambient light. As another example, wearable device 1100 may turn the display off if little or no light is sensed for a period of time.

Sensors 1116 can include various electronic, mechanical, electromechanical, optical, or other devices that provide information to wearable device 1100. For instance, clasp sensor 1150 can be at least partially disposed within either or both of clasp members 1010A, 1010B of FIG. 10 and can detect when clasp members 1010A, 1010B are engaged with each other or disengaged from each other. For example, engaging clasp members 1010A, 1010B to each other can complete an electrical circuit, allowing current to flow through clasp sensor 1150; disengaging clasp members 1010A, 1010B from each other can break the circuit. As another example, one or more crown sensors 1152 can be disposed to detect input from crown 1012 of FIG. 10. Crown sensors 1152 can also include motion sensors, accelerometers, pressure sensors (e.g., piezoelectric devices), or the like.

Any other type of sensor can be used in addition to or instead of strap sensors 1116 and crown sensors 1152. For instance, physiological or biometric sensors, such as pulse sensors, ECG sensors, or the like can be provided. In some embodiments, physiological sensors can monitor a user's physiological signals and provide health-related information based on those signals. In certain embodiments, physiological or biometric sensors can be used in verifying the identity of the wearer of wearable device 1100.

Certain embodiments may incorporate one or more biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. In some embodiments, the device may also measure blood pressure, ultraviolet exposure, etc. Depending on the sensors incorporated into or associated with the electronic device, a variety of user characteristics may be measured and/or estimated, thereby permitting different health information to be provided to a user. In some examples, the sensed biometric information may be used by the alert manager, in part, for managing the electronic content and/or the incoming alerts.

Similarly, wearable device 1100 may include a force sensor (not shown here) to determine an amount of force applied to the cover glass. The force sensor may be a capacitive sensor in some embodiments and a strain sensor in other embodiments. In either embodiment, the force sensor is generally transparent and made from transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

Power subsystem 1112 can provide power and power management capabilities for wearable device 1100. For example, power subsystem 1112 can include a battery 1140 (e.g., a rechargeable battery) and associated circuitry to distribute power from battery 1140 to other components of wearable device 1100 that require electrical power. In some embodiments, power subsystem 1112 can also include circuitry operable to charge battery 1140, e.g., when connector interface 1110 is connected to a power source. In some embodiments, power subsystem 1112 can include a "wireless" charger, such as an inductive charger, to charge battery 1140 without relying on connector interface 1110. An inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes. In some embodiments, power subsystem 1112 can also include other power sources, such as a solar cell, in addition to or instead of battery 1140.

In some embodiments, power subsystem 1112 can control power distribution to components within wearable device 1100 to manage power consumption efficiently. For example, power subsystem 1112 can automatically place device 1100 into a "hibernation" state when strap sensors 1116 indicate that device 1100 is not being worn. The hibernation state can be designed to reduce power consumption; accordingly, user interface 1106 (or components thereof), RF interface 1108, connector interface 1110, and/or environmental sensors 1114 can be powered down (e.g., to a low-power state or turned off entirely), while strap sensors 1116 are powered up (either continuously or at intervals) to detect when a user puts on wearable device 1100. As another example, in some embodiments, while wearable device 1100 is being worn, power subsystem 1112 can turn display 1120 and/or other components on or off depending on motion and/or orientation of wearable device 1100 detected by environmental sensors 1114. For instance, if wearable device 1100 is designed to be worn on a user's wrist, power subsystem 1112 can detect raising and rolling of a user's wrist, as is typically associated with looking at a wristwatch, based on information provided by accelerometer 1142. In response to this detected motion, power subsystem 1112 can automatically turn display 1120 and/or touch sensor 1128 on; similarly, power subsystem 1112 can automatically turn display 1120 and/or touch sensor 1128 off in response to detecting that user's wrist has returned to a neutral position (e.g., hanging down).

Power subsystem 1112 can also provide other power management capabilities, such as regulating power consumption of other components of wearable device 1100 based on the source and amount of available power, monitoring stored power in battery 1140, generating user alerts if the stored power drops below a minimum level, and so on.

In some embodiments, control functions of power subsystem 1112 can be implemented using programmable or controllable circuits operating in response to control signals generated by processing subsystem 1102 in response to program code executing thereon, or as a separate microprocessor or microcontroller.

It will be appreciated that wearable device 1100 is illustrative and that variations and modifications are possible.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for displaying information on an electronic watch for times other than a current time, the method comprising, at the electronic watch:
displaying a first watch face on a display of the electronic watch, the first watch face including one or more data windows for providing information other than time;
displaying, in a first data window of the first watch face, current information corresponding to a first application associated with the electronic watch, the current information corresponding to the current time, the first application configured to provide time-dependent information;
displaying, in a second data window of the first watch face, current information from a second application executing on the electronic watch, the current information corresponding to the current time, the second application configured to provide time-dependent information;
receiving N data records from the first application, the N data records including respective information for a first set of various times, where N is an integer greater than one;
receiving additional data records from the second application, each of the additional data records including respective information for a second set of various times;
storing the N data records and additional data records in a memory of the electronic watch;
entering a first mode of operation in response to user input, the first mode of operation allowing a user to view the respective information from the first application or from the second application for different times;
receiving, via an input device, a change in a time setting to be different than the current time;
identifying one of the N data records as corresponding to the change in the time setting;
identifying that none of the additional data records correspond to the change in the time setting;
determining a substitute additional data record to correspond to the change in the time setting;
retrieving, from the memory, the one data record of the N data records and the substitute additional data record;
displaying, in the first data window, the respective information of the one data record; and
displaying, in the second window, the respective information of the substitute additional data record.

2. The method of claim 1, wherein at least two of the N data records are received at different times.

3. The method of claim 1, further comprising, at the electronic watch:
displaying the current time in a first time window of the display; and
displaying a selected time corresponding to the change in the time setting in a second time window of the display.

4. The method of claim 3, wherein the selected time is displayed as an offset time relative to the current time.

5. The method of claim 1, wherein identifying one of the N data records as corresponding to the change in the time setting includes:
determining a selected time based on the change in the time setting; and
identifying a data record having a closest time to the selected time.

6. The method of claim 5, further comprising, at the electronic watch:
determining that the selected time is within a specified time duration of a final data record of the N data records; and
requesting additional data records from a companion device.

7. The method of claim 1, wherein at least a portion of the N data records have a time before the current time, and wherein at least a portion of the N data records have a time after the current time.

8. The method of claim 1, further comprising, at the electronic watch:
sending, by the first application to a corresponding application on a companion device, a request for the N data records, the companion device in communication with the electronic watch; and
receiving, by the first application, the N data records from the corresponding application on the companion device.

9. The method of claim 1, wherein the N data records are received by a display manager that determines how the respective information of the N data records is to be displayed, and wherein the display manager:
stores the respective information in the memory of the electronic watch,
retrieves the respective information from the memory when the first mode of operation is entered, and
stores the respective information in a cache of a processor of the electronic watch for using in response to identifying the one of the N data records.

10. The method of claim 1, wherein the N data records are received with the current information.

11. The method of claim 1, further comprising, at the electronic watch:
sending refresh data preference to a companion device, the refresh data preference specifying a rate for the companion device to provide data for displaying in the first data window.

12. A computer product comprising a non-transitory computer readable medium storing instructions, that when executed on one or more processors of a computing device, cause displaying information on the computing device for times other than a current time, the instructions comprising:
displaying a first watch face on a display of the computing device, the first watch face including one or more data windows for providing other information than time;
displaying, in a first data window of the first watch face, current information corresponding to a first application associated with the computing device, the current information corresponding to the current time, the first application configured to provide time-dependent information;
displaying, in a second data window of the first watch face, current information from a second application executing on the electronic watch, the current information corresponding to the current time, the second application configured to provide time-dependent information;
receiving N data records from the first application, each of the N data records including respective information for a different time, where N is an integer greater than one;
receiving additional data records from the second application, each of the additional data records including respective information for a different time;

storing the N data records and additional data records in a memory of the computing device;

entering a first mode of operation in response to user input, the first mode of operation allowing a user to view the respective information from the first application or from the second application for different times;

receiving, via an input device, a change in a time setting to be different than the current time;

identifying one of the N data records as corresponding to the change in the time setting;

identifying that none of the additional data records correspond to the change in the time setting;

determining a substitute additional data record to correspond to the change in the time setting;

retrieving, from the memory, the one data record of the N data records and the substitute additional data record;

displaying, in the first data window, the respective information of the one data record; and displaying, in the second data window, the respective information of the substitute additional data record.

13. The computer product of claim 12, wherein identifying one of the N data records as corresponding to the change in the time setting includes:

determining a selected time based on the change in the time setting; and identifying a data record having a closest time to the selected time, wherein the instructions further comprise:

determining that the selected time is within a specified time duration of a final data record of the N data records; and requesting additional data records from a companion device.

14. The computer product of claim 12, wherein the N data records are received by a display manager that determines how the respective information of the N data records is to be displayed, and wherein the display manager:

stores the respective information in the memory of the computing device, retrieves the respective information from the memory when the first mode of operation is entered, and stores the respective information in a cache of the one or more processors of the computing device for using in response to identifying the one of the N data records.

15. A computing device for displaying information for times other than a current time, the computing device comprising:

a display;

a memory;

one or more processors communicably that are coupled with the display and the memory and that are configured to:

display a first watch face on a display of the computing device, the first watch face including one or more data windows for providing other information than time;

display, in a first data window of the first watch face, current information corresponding to a first application associated with the computing device, the current information corresponding to the current time, the first application configured to provide time-dependent information;

display, in a second data window of the first watch face, current information from a second application executing on the electronic watch, the current information corresponding to the current time, the second application configured to provide time-dependent information;

receive N data records from the first application, each of the N data records including respective information for a different time, where N is an integer greater than one;

receive additional data records from the second application, each of the additional data records including respective information for a second set of various times;

store the N data records in the memory of the computing device;

enter a first mode of operation in response to user input, the first mode of operation allowing a user to view the respective information from the first application or from the second application for different times;

receive, via an input device, a change in a time setting to be different than the current time;

identify one of the N data records as corresponding to the change in the time setting;

identify that none of the additional data records correspond to the change in the time setting;

determine a substitute additional data record to correspond to the change in the time setting;

retrieve, from the memory, the one data record of the N data records and the substitute additional data record;

display, in the first data window, the respective information of the one data record; and display, in the second data window, the respective information of the substitute additional data record.

16. The computing device of claim 15, wherein identifying one of the N data records as corresponding to the change in the time setting includes:

determining a selected time based on the change in the time setting; and identifying a data record having a closest time to the selected time, wherein the one or more processors are further configured to:

determine that the selected time is within a specified time duration of a final data record of the N data records; and request additional data records from a companion device.

17. The computing device of claim 15, further comprising:

a cache of the one or more processors, wherein the N data records are received by a display manager that is executing on the one or more processors and that determines how the respective information of the N data records is to be displayed, and wherein the one or more processors are further configured to have the display manager:

store the respective information in the memory of the computing device, retrieve the respective information from the memory when the first mode of operation is entered, and store the respective information in the cache for using in response to identifying the one of the N data records.

* * * * *